United States Patent
Shpunt

(10) Patent No.: US 11,070,785 B2
(45) Date of Patent: Jul. 20, 2021

(54) DYNAMIC FOCUS 3D DISPLAY

(71) Applicant: Apple Inc., Cupertino, CA (US)

(72) Inventor: Alexander Shpunt, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/894,641

(22) Filed: Jun. 5, 2020

(65) Prior Publication Data

US 2020/0304771 A1 Sep. 24, 2020

Related U.S. Application Data

(63) Continuation of application No. 16/598,638, filed on Oct. 10, 2019, now Pat. No. 10,681,328, which is a continuation of application No. 15/405,226, filed on Jan. 12, 2017, now abandoned.

(60) Provisional application No. 62/278,419, filed on Jan. 13, 2016.

(51) Int. Cl.
| | |
|---|---|
| H04N 13/144 | (2018.01) |
| G02B 3/00 | (2006.01) |
| G02B 26/10 | (2006.01) |
| H04N 13/344 | (2018.01) |
| H04N 7/18 | (2006.01) |
| G02B 27/30 | (2006.01) |
| G06F 3/01 | (2006.01) |
| G02B 30/35 | (2020.01) |

(52) U.S. Cl.
CPC ......... *H04N 13/144* (2018.05); *G02B 3/0056* (2013.01); *G02B 26/101* (2013.01); *G02B 26/105* (2013.01); *G02B 27/30* (2013.01); *G02B 30/35* (2020.01); *G06F 3/013* (2013.01); *H04N 7/181* (2013.01); *H04N 13/344* (2018.05)

(58) Field of Classification Search
CPC ... H04N 13/344; G02B 3/0056; G02B 26/101
USPC .......................................................... 348/53
See application file for complete search history.

(56) References Cited

U.S. PATENT DOCUMENTS

| | | | | |
|---|---|---|---|---|
| 6,084,697 | A | * | 7/2000 | Lebby .................... G02B 26/02 359/201.1 |
| 9,229,227 | B2 | | 1/2016 | Border et al. |
| 9,297,945 | B2 | | 3/2016 | Ide et al. |
| 10,681,328 | B1 | | 6/2020 | Shpunt |

(Continued)

OTHER PUBLICATIONS

U.S. Appl. No. 15/357,938, filed Nov. 21, 2016, Richard J. Topliss.

*Primary Examiner* — Jeffery A Williams
(74) *Attorney, Agent, or Firm* — Robert C. Kowert; Kowert, Hood, Munyon, Rankin & Goetzel, P.C.

(57) ABSTRACT

A direct retinal projector system that provides dynamic focusing for virtual reality (VR) and/or augmented reality (AR) is described. A direct retinal projector system scans images, pixel by pixel, directly onto the subject's retinas. This allows individual pixels to be optically affected dynamically as the images are scanned to the subject's retinas. Dynamic focusing components and techniques are described that may be used in a direct retinal projector system to dynamically and correctly focus each pixel in VR images as the images are being scanned to a subject's eyes. This allows objects, surfaces, etc. that are intended to appear at different distances in a scene to be projected to the subject's eyes at the correct depths.

19 Claims, 17 Drawing Sheets

(56) References Cited

U.S. PATENT DOCUMENTS

| | | |
|---|---|---|
| 2008/0018641 A1 | 6/2008 | Sprague et al. |
| 2012/0281293 A1 | 11/2012 | Gronenborn et al. |
| 2013/0335302 A1 | 12/2013 | Crane et al. |
| 2015/0241614 A1 | 8/2015 | Ide et al. |
| 2015/0248158 A1 | 9/2015 | Schowengerdt |
| 2015/0277121 A1* | 10/2015 | Fridental .............. H04N 13/322 348/54 |
| 2015/0277123 A1 | 10/2015 | Chaum et al. |
| 2016/0150201 A1* | 5/2016 | Kilcher ................ G02B 26/101 348/745 |
| 2017/0068091 A1 | 3/2017 | Greenberg |
| 2017/0285343 A1 | 10/2017 | Belenkii et al. |

\* cited by examiner

DYNAMIC FOCUS 3D DISPLAY

PRIORITY INFORMATION

This application is a continuation of U.S. patent application Ser. No. 16,598,638, filed Oct. 10, 2019, which is a continuation of U.S. patent application Ser. No. 15/405,226, filed Jan. 12, 2017, which claims benefit of priority of U.S. Provisional Application Ser. No. 62/278,419, filed Jan. 13, 2016, the content of which are incorporated by reference herein in their entirety.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, augmented reality (AR) combines computer generated information with real world images to augment, or add content to, a user's view of the world. The simulated environments of virtual reality and/or the enhanced content of augmented reality may thus be utilized to provide an interactive user experience for multiple applications, such as interacting with virtual training environments, gaming, remotely controlling drones or other mechanical systems, viewing digital media content, interacting with the internet, or the like.

However, conventional virtual reality and augmented reality systems may suffer from accommodation-convergence mismatch problems that cause eyestrain, headaches, and/or nausea. Accommodation-convergence mismatch arises when a VR or AR system effectively confuses the brain of a user by generating scene content that does not match the depth expected by the brain based on the stereo convergence of the two eyes of the user. For example, in a stereoscopic system the images displayed to the user may trick the eye(s) into focusing at a far distance while an image is physically being displayed at a closer distance. In other words, the eyes may be attempting to focus on a different image plane or focal depth compared to the focal depth of the projected image, thereby leading to eyestrain and/or increasing mental stress. Accommodation-convergence mismatch problems are undesirable and may distract users or otherwise detract from their enjoyment and endurance levels (i.e. tolerance) of virtual reality or augmented reality environments.

SUMMARY

Various embodiments of methods and apparatus for providing dynamic focusing in virtual reality (VR) and/or augmented reality (AR) systems are described. Conventional VR systems project left and right images onto screens that are viewed by a subject. A direct retinal projector system, however, scans the images, pixel by pixel, directly onto the subject's retinas. This aspect of direct retinal projector systems allows individual pixels to be optically affected dynamically as the images are scanned to the subject's retinas. Embodiments of dynamic focusing components and techniques are described that may be used in a direct retinal projector system to dynamically and correctly focus each pixel in VR images as the images are being scanned to a subject's eyes. This allows content (objects, surfaces, etc.) that is intended to appear at different depths in a scene to be projected to the subject's eyes at the correct depths. Thus, the dynamic focusing components and techniques for direct retinal projector systems may help to reduce or eliminate the convergence-accommodation conflict in VR systems. A VR or AR headset system is described that may include or implement the dynamic focusing components and techniques in a direct retinal projector system.

In some embodiments, a light emitting device of a direct retinal projector system may include a one- or two-dimensional array of light emitting elements. Note that there may be two projector units each including a light emitting device in the direct retinal projector system, with one projector unit for each of the subject's eyes. In some embodiments, there may be a collimating lens corresponding to the light emitting device in each projector unit. The light emitting elements in each light emitting device may, for example, include edge emitting lasers, vertical cavity surface emitting lasers (VCSELs), or other types of light emitting elements, for example light emitting diodes (LEDs). In some embodiments, the light emitting elements in each light emitting device may be grouped into subsets (referred to as focus groups) 1-N, for example with each group including at least one red light emitting element, at least one blue light emitting element, and at least one green light emitting element, with the light emitting elements in each focus group configured to focus their emitted light beams at respective focus distances $f_1$-$f_N$ relative to the respective collimating lens. Different optical or mechanical techniques may be used to focus the light beams. For example, in some embodiments, an array of focusing microlenses may be arranged in front of the light emitting device, with a microlens corresponding to each light emitting element, and with the microlenses corresponding to each of focus groups 1-N configured to focus at the respective focus distance $f_1$-$f_N$ of the group.

In a direct retinal projector system, there are two images representing a frame in a scene to be projected to the subject's eyes. To create a three-dimensional (3D) effect, objects or surfaces at different depths or distances in the two images are shifted as a function of the triangulation of distance, with nearer objects shifted more than more distant objects. In some embodiments, this shift data may be used to determine relative depth of content (e.g., objects, surfaces, etc.) in the images, and thus to generate depth maps for the respective images.

In some embodiments, for each pixel of each image to be projected when scanning the images to the subject's eyes, a controller component of the direct retinal projector system may determine or obtain a respective depth for the pixel in the scene, for example from a depth map for the respective image. The controller may then use this depth information to selectively fire a focus group of light emitting elements that provide a focus distance f corresponding to the determined depth for the pixel. The light emitting elements in the group then emit light beams (e.g., pulsed light beams) of respective wavelengths (e.g., red, green, and blue). Focusing components of the direct retinal projector system (e.g., microlenses) focus the light beams at the focus distance f of the group. In some embodiments, a collimating lens on the light path of the focused beams refracts the beams, for example to a scanning mirror that scans the collimated beams to a curved mirror that reflects the scanned beams to the subject's eyes.

Figure 1:
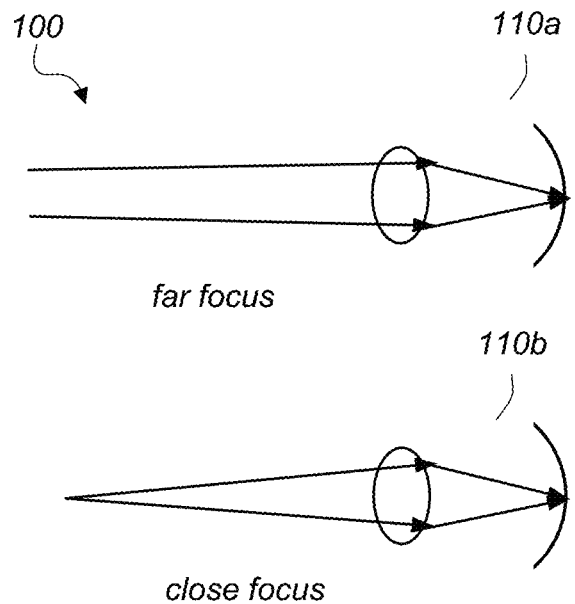
FIG. 1 is an example of different types of eye focus.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for providing dynamic focusing in virtual reality (VR) and/or augmented reality (AR) systems are described. Embodiments of dynamic focusing components and techniques for direct retinal projector systems are described that may, for example, resolve the convergence-accommodation conflict in AR and VR systems. Embodiments of the dynamic focusing components and techniques may be used in a direct retinal projector system to correctly focus each pixel in VR images as the images are being scanned to a subject's eyes. A VR or AR headset system is described that may include or implement the dynamic focusing components and techniques in a direct retinal projector system.

Accommodation and Convergence in AR/VR Systems

FIG. 1 depicts an example of different types of eye focus. In system 100 of FIG. 1, an eye 110A may be adapted to focus at a far distance, as shown by the incident light originating from a distant location and focusing onto the retina (i.e., the back internal surface) of eye 110A by the internal lens of eye 110A. In another embodiment, eye 110A may instead be adapted for a close focus scenario, as shown by light from a nearby location being incident upon the eye and focusing onto the retina.

The human brain typically uses two cues to gauge distance: accommodation (i.e., eye focus) and eye convergence (i.e., the stereoscopic perspective difference between the two eyes). Conventional near-eye VR systems, such as DLP (digital light processing), LCD (liquid crystal display) and LCoS (liquid crystal on silicon) technology VR systems, typically use separate screens for each respective eye to project the images intended for the left eye and the right eye, as well as optics to allow a user to focus the eyes at a far distance during viewing of the left and right eye images. To create a three-dimensional (3D) effect, objects at different depths or distances in the two images are shifted left or right as a function of the triangulation of distance, with nearer objects shifted more than more distant objects.

Figure 2:
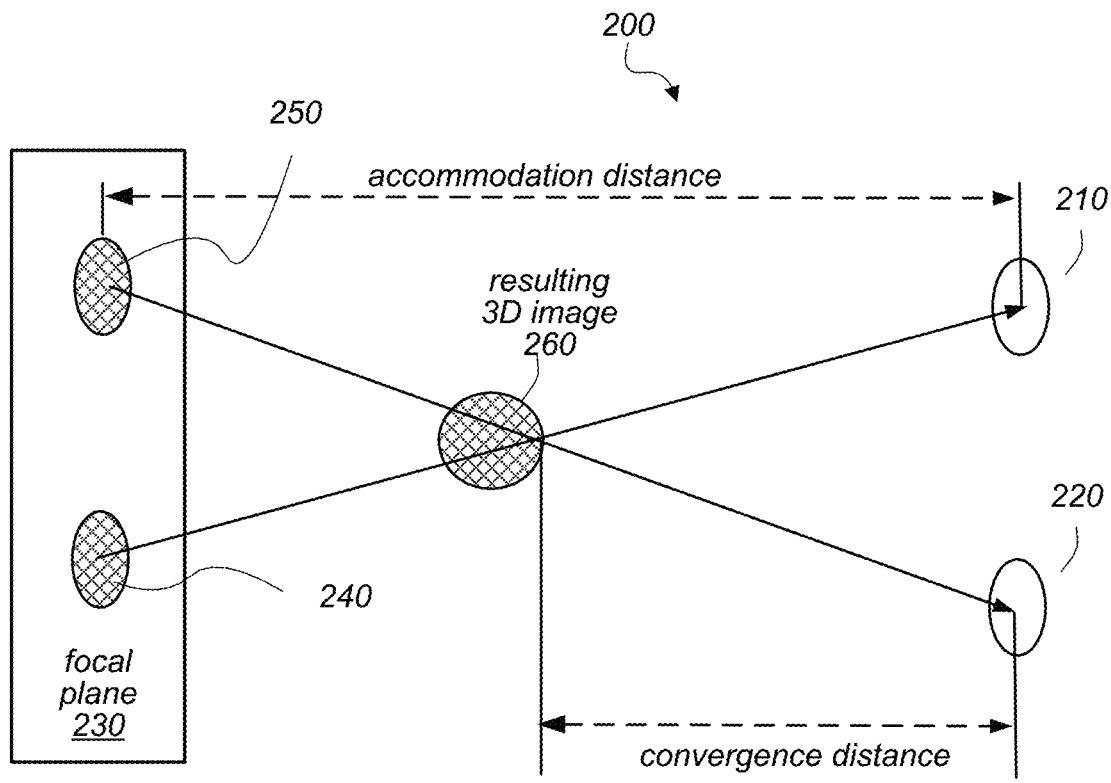
FIG. 2 illustrates a conventional near-eye virtual reality system.

FIG. 2 illustrates a conventional near-eye VR system 200 that uses separate screens for each respective eye to project the images intended for the eyes. As depicted, right eye 210 and left eye 220 are focused on a focal plane 230 where an image for right eye 240 and an image for left eye 250, respectively, are displayed. As right eye 210 and left eye 220 focus on their respective images at focal plane 230, the brain of the user combines the images into a resulting 3D image 260. The accommodation distance may be defined as the distance between focal plane 230 and an eye of the user (e.g., right eye 210 and/or left eye 220), and the convergence distance may be defined as the distance between resulting 3D image 260 and an eye of the user.

These conventional near-eye VR systems may produce conflicting visual cues since the resulting 3D image produced by the brain effectively appears at a convergence distance that is closer than the accommodation distance that each eye focuses on separately, thereby leading to the possibility of headache and/or nausea over time. Further, using the planar optical design of these conventional systems, the subject's eyes will in all cases focus on a given plane, or focus at infinity. However, objects in the scene may need to appear at several different distances, while the eyes converge at one distance but focus on a given plane or at infinity, further contributing to the possibility of headache and/or nausea over time. Heavy users of conventional VR systems may potentially train themselves to compensate for accommodation-convergence mismatch, but a majority of users might not.

Dynamic Focus 3D Display

Conventional VR systems as described above project left and right images onto screens that are viewed by a subject. A direct retinal projector system as described herein, however, scans the images, pixel by pixel, directly onto the subject's retinas. This aspect of direct retinal projector systems allows individual pixels to be optically affected dynamically as the images are scanned to the subject's retinas. For example, embodiments of the dynamic focusing components and techniques as described herein may be used in a direct retinal projector system to dynamically and correctly focus each pixel in the VR images as the images are being scanned to a subject's eyes. This allows content (objects, surfaces, etc.) that is intended to appear at different depths in a scene to be projected to the subject's eyes at the correct depths. Thus, the dynamic focusing components and techniques for direct retinal projector systems may help to reduce or eliminate the convergence-accommodation conflict in VR systems.

Figure 3A:
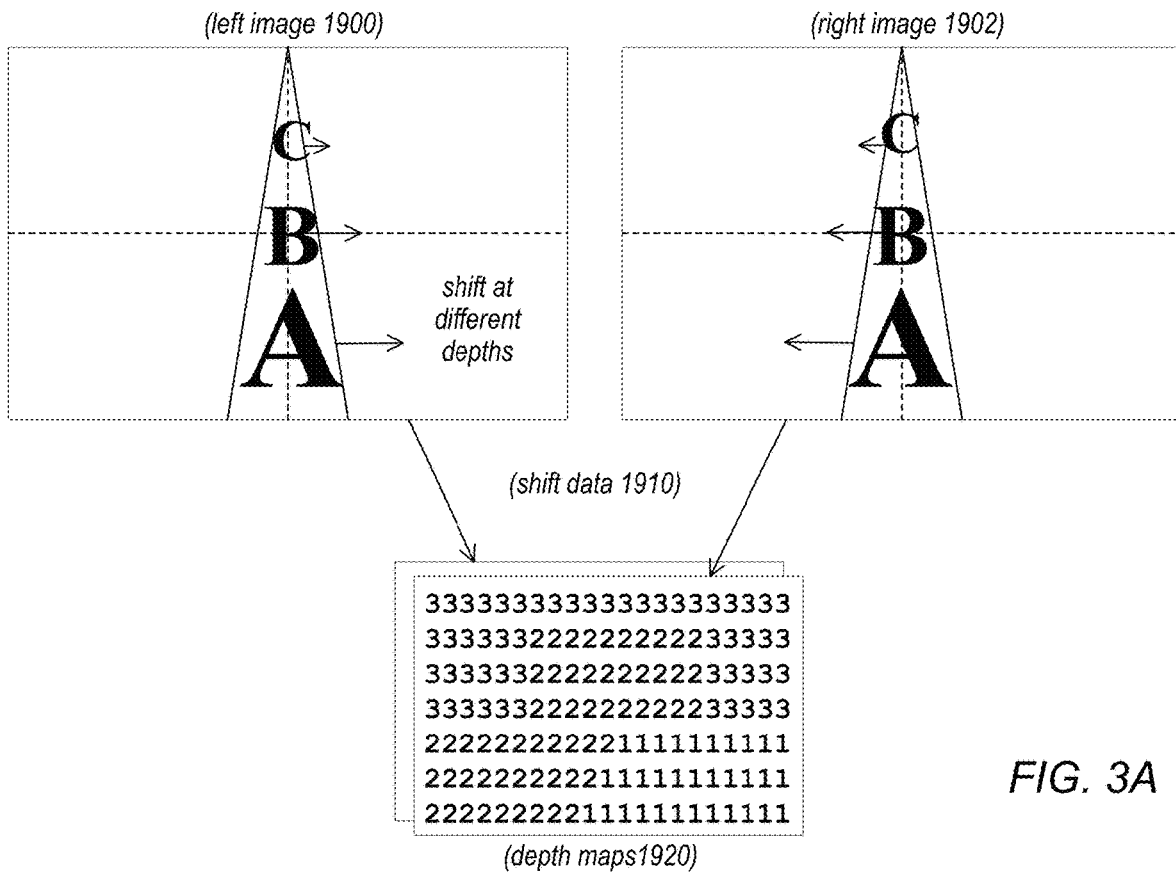
FIG. 3A illustrates depth information for virtual reality (VR) images.

FIG. 3A illustrates depth information for virtual reality (VR) images. In a direct retinal projector system, two images (1900 for the left eye and 1902 for the right eye) representing a frame in a scene to be projected to the subject's eyes are generated. To create a three-dimensional (3D) effect, objects or surfaces at different depths or distances in the two images (represented by A, the nearest object, B, a midrange object, and C, the farthest object) are shifted left or right as a function of the triangulation of distance, with nearer objects (e.g., A) shifted more than more distant objects (e.g., B and C). This shift data may be used to determine relative depth of content (e.g., objects, surfaces, etc.) in the images. In some embodiments, this shift data 1910 may be used to generate depth maps 1920 for the respective images. Values for respective depths of the pixels in the images in the scene may be recorded in the depth maps 1920. In some embodiments, there may be N (e.g., 8) discrete values for depth, and each pixel in the images may be assigned a nearest one of the N values in the depth maps 1920. In some embodiments, the depth maps 1920 may be pre-generated for the images. In some embodiments, the depth maps 1920 may be dynamically generated as the images are processed by the direct retinal projector system. As an example, FIG. 3A shows an example depth map that records three depths (1, 2, 3) for pixels of objects A, B, and C, respectively, in image 1902.

Figure 3B:
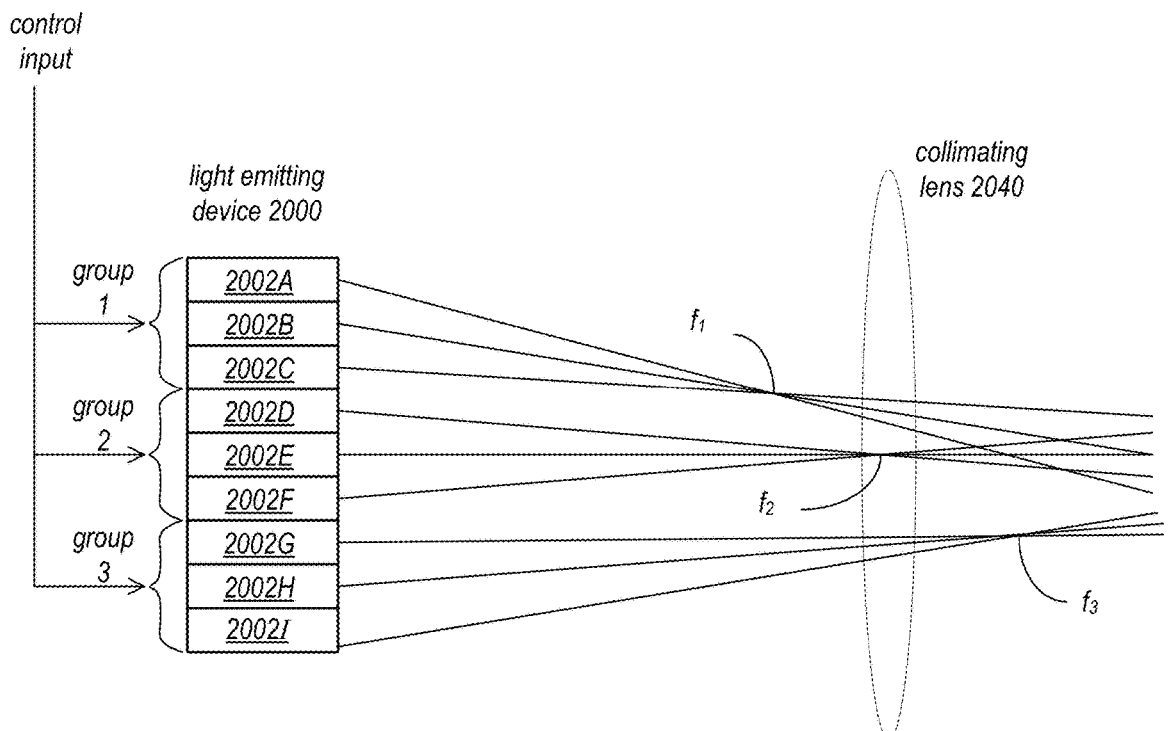
FIG. 3B illustrates focusing pixels at different depths in a direct retinal projector, according to some embodiments.

FIG. 3B illustrates focusing pixels at different depths in a direct retinal projector according to depth information for VR images, according to some embodiments. Since a direct retinal projector scans the images 1900 and 1902, pixel by pixel, directly onto the subject's retinas, individual pixels can be optically affected dynamically as the images are scanned. Focusing components and techniques may thus be used in a direct retinal projector system to dynamically and correctly focus each pixel in the images 1900 and 1902 as the images are being scanned to the subject's eyes. This allows content (objects, surfaces, etc.) that is intended to appear at different depths in the scene to be projected to the subject's eyes at the correct depths.

As shown in the example of FIG. 3B, a light emitting device 2000 of the direct retinal projector system may include a one- or two-dimensional array of light emitting elements 2002. Note that there may be two light emitting devices 2000 in the direct retinal projector system, with one device 2000 for each of the subject's eyes. In some embodiments, there may be a collimating lens 2040 for each device 2000. The light emitting elements 2002 in each device 2000 may, for example, include edge emitting lasers, vertical cavity surface emitting lasers (VCSELs), or other types of light emitting elements, for example light emitting diodes (LEDs). The light emitting elements 2002 in each device may be grouped into subsets (referred to as focus groups) 1, 2, and 3, for example with each group including at least one red light emitting element, at least one blue light emitting element, and at least one green light emitting element, with the light emitting elements 2002 in each focus group configured to focus their emitted light beams at respective focus distances $f_1$, $f_2$, and $f_3$ relative to the respective collimating lens 2040. Different optical or mechanical techniques may be used to focus the light beams, for example as described in reference to FIGS. 4 through 6. While FIG. 3B shows three focus groups 1, 2, and 3 that focus light at respective focus distances $f_1$, $f_2$, and $f_3$ as an example, a direct retinal projector may support dynamic focusing at N discrete focus distances (e.g., eight distances, although more or fewer focus distances may be supported), and thus there may be N focus groups in a direct retinal projector system.

Figure 8:
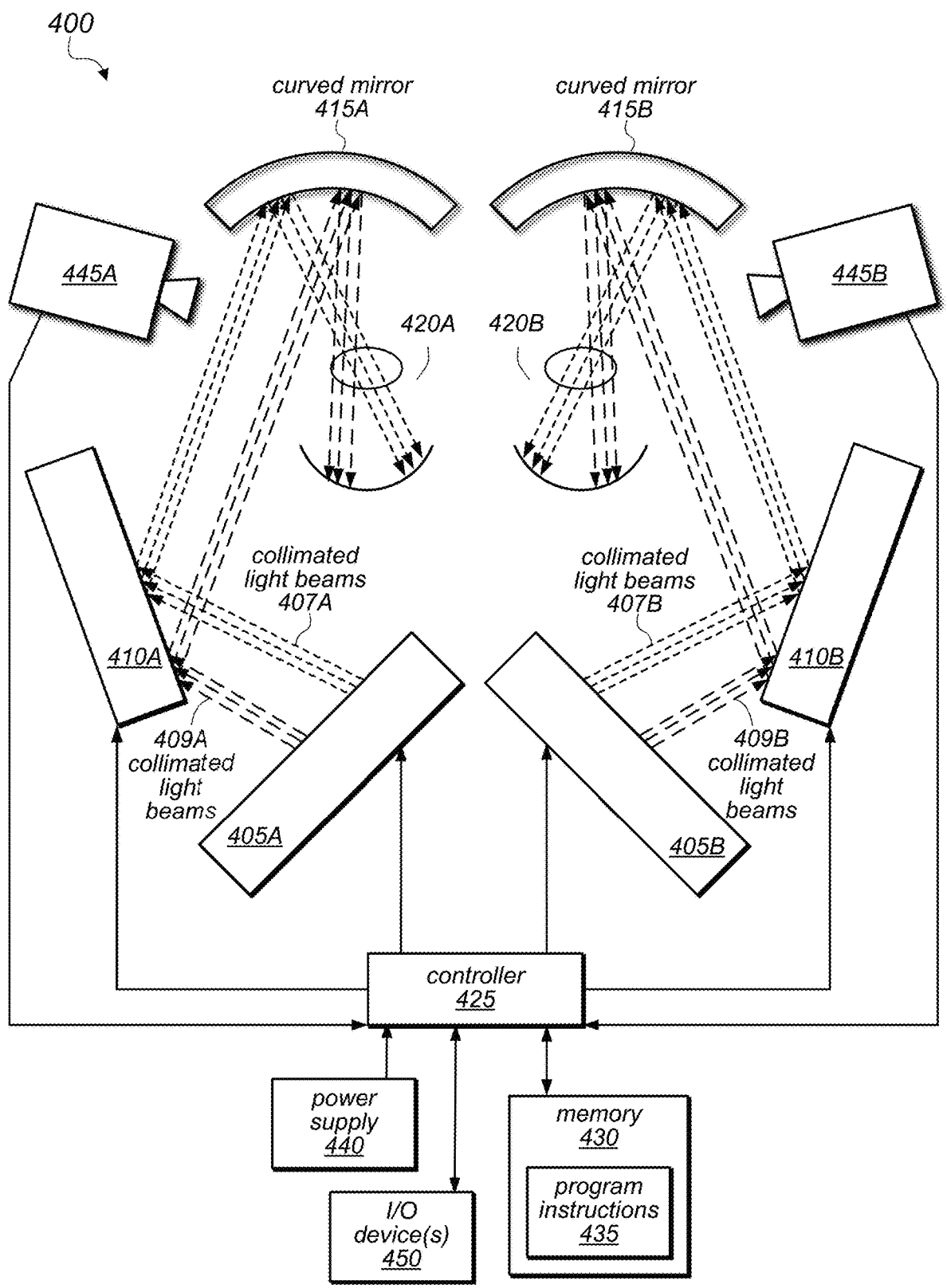
FIG. 8 is logical block diagram of a virtual reality (VR) and/or augmented reality (AR) device, according to some embodiments.
Figure 9:
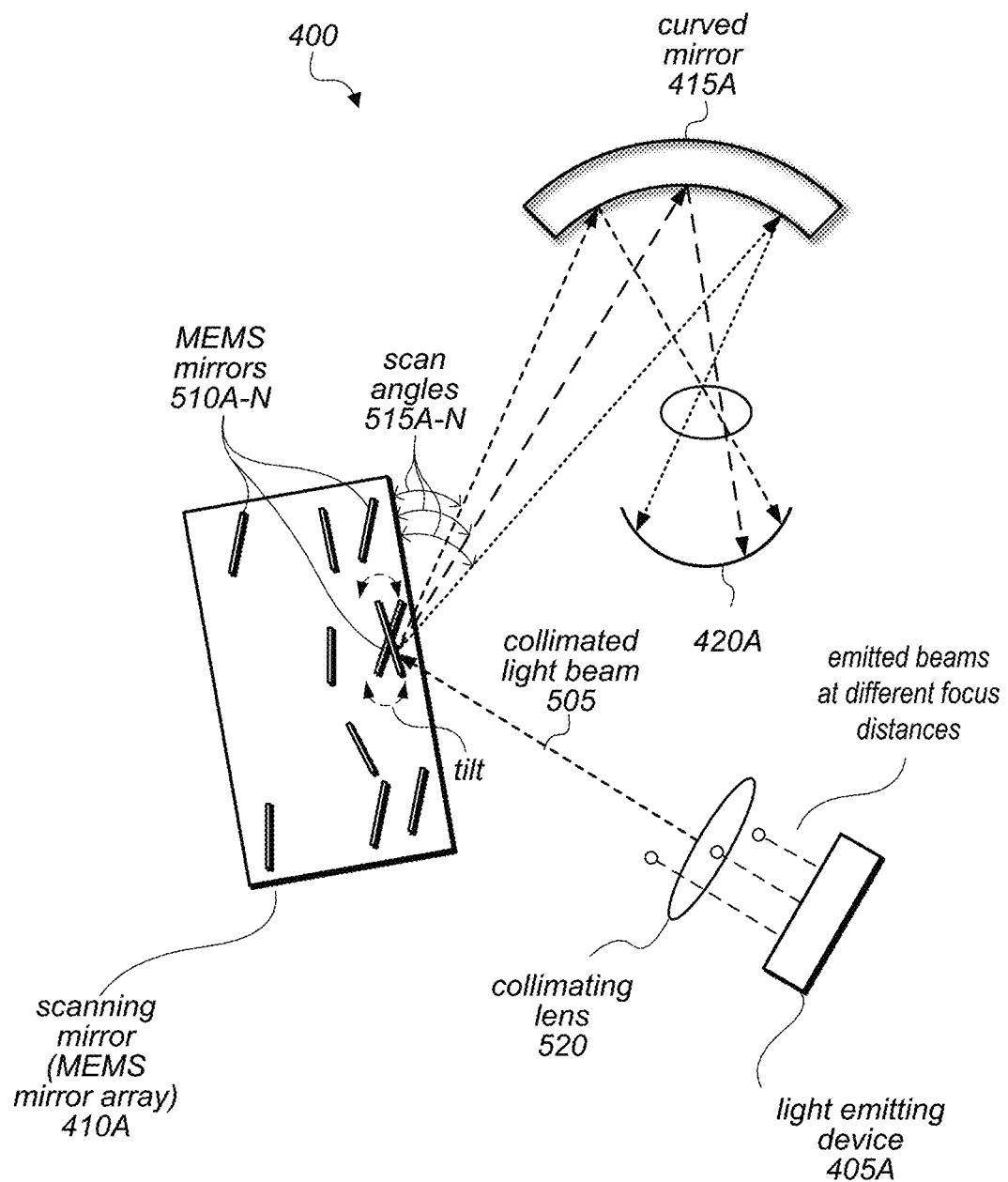
FIG. 9 is a logical block diagram of a raster scan generated using an array of MEMS mirrors, according to some embodiments.

In some embodiments, for each pixel of each image to be projected when scanning the images 1900 and 1902 to the subject's eyes, a controller component of the direct retinal projector system (see, e.g., FIG. 8) may determine or obtain a respective depth for the pixel in the scene, for example from a depth map 1920 for the respective image. The controller may then use this depth information to selectively fire a focus group of light emitting elements 2002 that provide a focus distance f corresponding to the determined depth for the pixel, e.g., group 1, 2, or 3 in FIG. 3B. The light emitting elements 2002 in the group then emit light beams (e.g., pulsed light beams) of respective wavelengths (e.g., red, green, and blue). Optical or mechanical beam focusing components of the direct retinal projector system focus the light beams at the focus distance of the group (e.g. $f_1$ for group 1, $f_2$ for group 2, and $f_3$ for group 3). A collimating lens 2040 on the light path of the focused beams refracts the beams, for example to a scanning mirror that scans the collimated beams to a curved mirror that reflects the scanned beams to the subject's eyes as shown in FIGS. 8 and 9.

Figure 4:
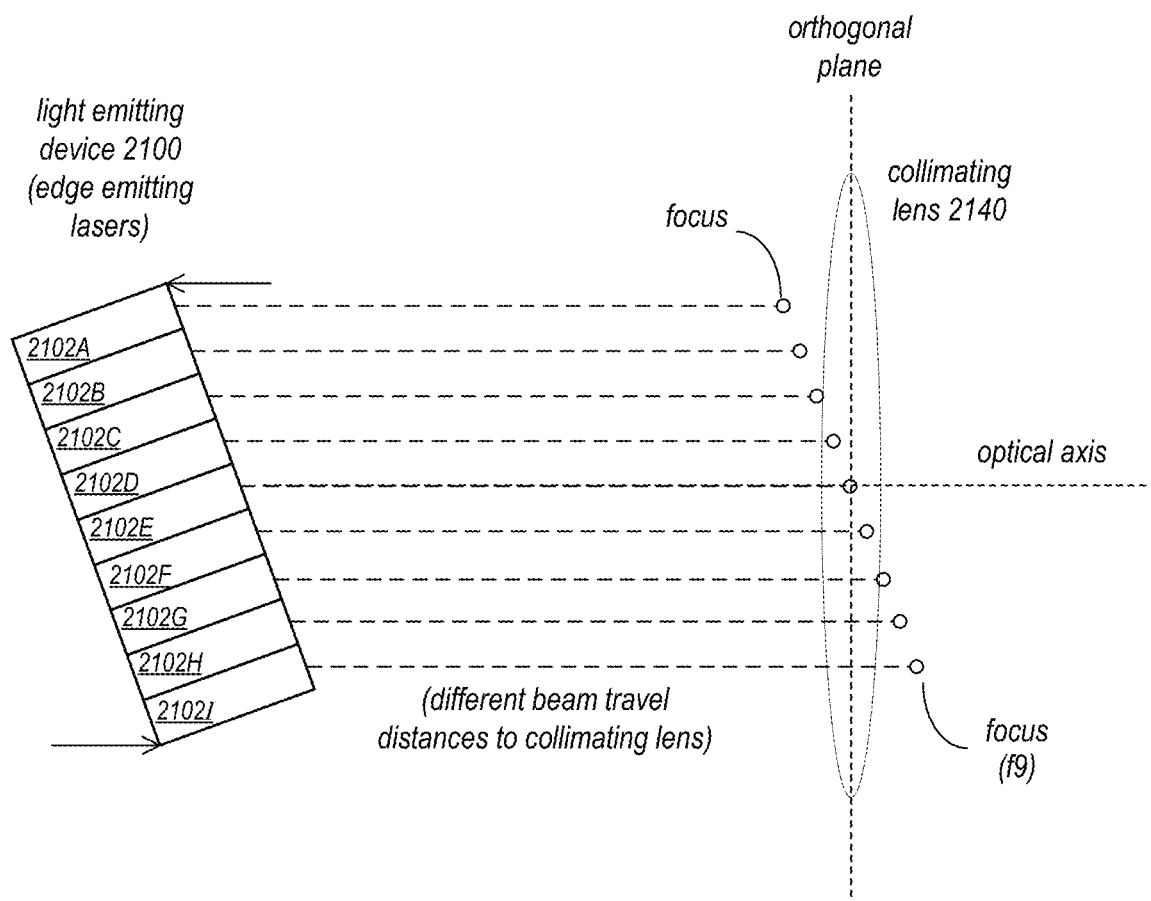
FIG. 4 illustrates focusing pixels at different depths in a direct retinal projector by rotating a light emitting device, according to some embodiments.

FIG. 4 illustrates focusing pixels at different depths in a direct retinal projector by rotating or tilting a light emitting device, according to some embodiments. A light emitting device 2100 may include a one- or two-dimensional array of light emitting elements 2102, for example edge emitting lasers. The light emitting elements 2102 may be grouped, for example into groups of red, green, and blue edge emitting lasers. The light emitting device 2100 may be rotated or tilted with respect to the optical axis of the system and thus may be at an angle with respect to the plane of the collimating lens 2140 such that the output beams of different ones or different groups of the light emitting elements 2102 in the light emitting device 2100 travel different distances to reach the collimating lens 2140. The different beam travel distances 1320 may correspond to respective focus points for various depths in images to be scanned to the subject's eyes. FIG. 4 shows nine light emitting elements (or groups of light emitting elements) 2102A-2102I that provide nine focus points $f_1$-$f_9$. The direct retinal projector's controller may dynamically activate and/or modulate various light emitting elements 2102 or groups of light emitting elements 2102 in the light emitting devices 2100 to dynamically focus pixels at different depths in the images being scanned based on the depth information (e.g., depth maps) for the images. The direct retinal projector may thus dynamically shift between different light emitting elements 2102 or groups of light emitting elements 2102 in order to scan pixels focused at different distances to the subject's eyes. This allows the direct retinal projector to project objects and surfaces in scenes to the subject's eyes at the correct depths for the objects and surfaces in the scenes.

Figure 5A:
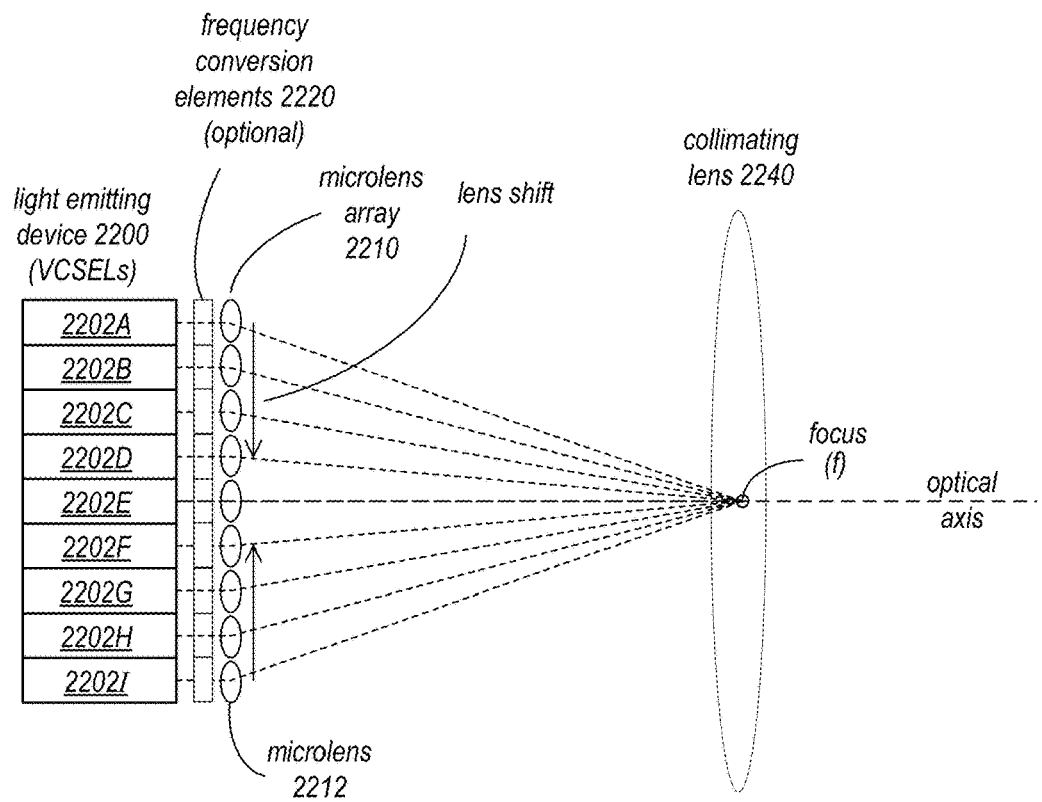
FIGS. 5A and 5B illustrate focusing pixels at different depths in a direct retinal projector using a microlens array with the light emitting device, according to some embodiments.
Figure 5B:
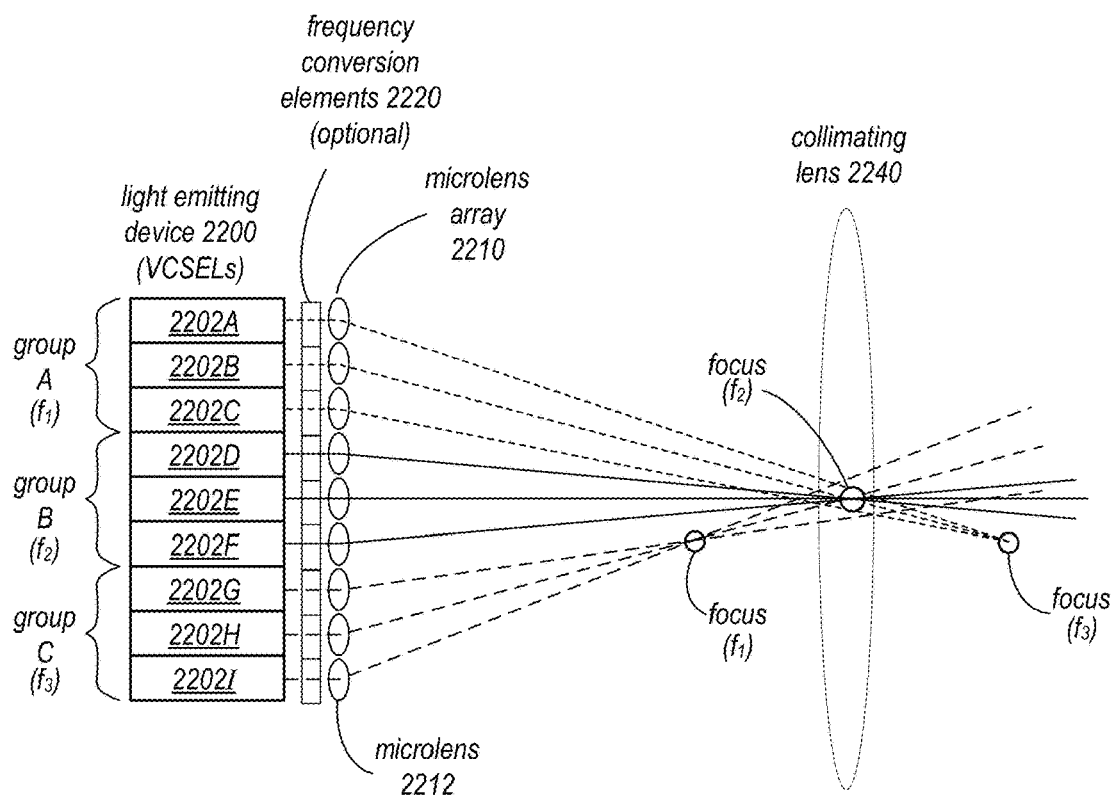

FIGS. 5A and 5B illustrate focusing pixels at different depths in a direct retinal projector using a microlens array with the light emitting device, according to some embodiments. As shown in FIG. 5A, a light emitting device 2200 may include a one- or two-dimensional array of light emitting elements 2202, for example vertical cavity surface emitting lasers (VCSELs). An array of focusing microlenses 2212 (microlens array 2210) may be positioned in front of the VCSELs in light emitting device 2200 and between the light emitting device 2200 and the collimating lens 2240. Each microlens 2212 is in front of and corresponds to one of the VCSELs in the light emitting device 2200 so that light emitted from a given VCSEL passes through and is refracted by its corresponding microlens 2212. In order for the light emitting device 2200 to appear as a point source, at least some of the microlenses 2212 in the array may be shifted with respect to a center (optical axis) of the system so that the light rays are refracted to a focal point f.

To provide color imaging (e.g., RGB imaging), different ones of the light emitting elements in device 2200 need to provide red, green, and blue light, with red, green, and blue light emitting elements in each group that are activated differently to provide various colors in the pixels. However, VCSELs may be limited to red wavelengths. Thus, in some embodiments, the system may include frequency conversion elements 2220 (e.g., crystals of neodymium trifluoride (NdF3) or other material with similar frequency conversion properties) located between the light emitting device 2200 and the collimation lens 2240 to convert the emitted light in the red frequency into blue and/or green frequencies for some of the VCSELs 2202. FIG. 5A shows the frequency conversion elements 2220 located between the microlens array 2210 and the light emitting device 2200 by way of example; the frequency conversion elements 2220 may be located elsewhere, for example between the microlens array 2210 and the collimating lens 2240. Note that if green and blue VCSELs are or become available, the frequency conversion elements 2220 may not be necessary. Also note that an array of red-emitting VCSELs may be used without frequency conversion elements 2220 to provide monochrome virtual images.

As shown in FIG. 5B, to provide dynamic focusing of pixels at different depths, different groups of the microlenses 2212 in a microlens array 2210 as shown in FIG. 5A may be configured with different focal lengths. As shown in FIG. 5B, the light emitting elements 2102 may be grouped, for example into groups of three or more VCSELs. FIG. 5B shows three groups A, B, and C as an example. Microlenses 2212 corresponding to the groups A, B and C may have different physical characteristics (e.g., the microlenses 2212 may be of different shapes, and/or may be composed of different optical materials) to provide different optical properties (e.g., focal lengths) for the microlenses 2212 in the different groups. The light beams from the VCSELs 2202 in a given group are thus focused at a particular focus distance of the group. For example, in the example shown in FIG. 5B, microlenses 2212 of group A focus at focus distance $f_1$, microlenses 2212 of group B focus at focus distance $f_2$, and microlenses 2212 of group C focus at focus distance $f_3$. The direct retinal projector's controller may dynamically activate and/or modulate group A, B, or C of light emitting elements 2202 in the light emitting devices 2200 to dynamically focus pixels at different depths in the images being scanned based on the depth information (e.g., depth maps) for the images. The direct retinal projector may thus dynamically shift between different groups of light emitting elements 2202 and corresponding microlenses 2212 in order to scan pixels focused at different distances to the subject's eyes. This allows the direct retinal projector to project objects and surfaces in scenes to the subject's eyes at the correct depths for the objects and surfaces in the scenes.

Figure 6:
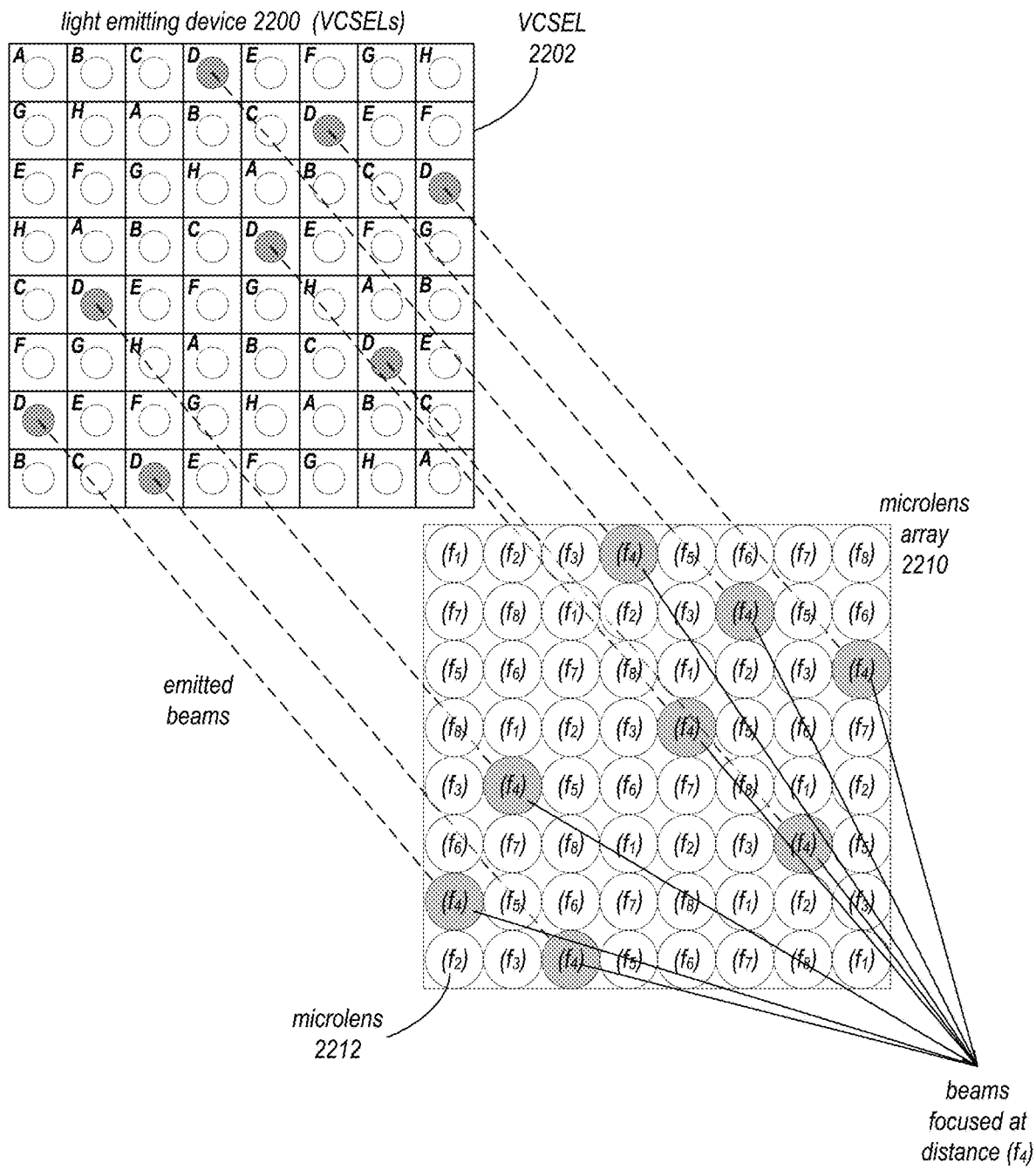
FIG. 6 further illustrates focusing pixels at different depths in a direct retinal projector using a microlens array with the light emitting device, according to some embodiments.

FIG. 6 further illustrates focusing pixels at different depths in a direct retinal projector using a microlens array 2210 with the light emitting device 2200, according to some embodiments. FIG. 6 shows an example light emitting device 2200 as a two-dimensional array of VCSELs 2202. Individual VCSELs 2202 may be assigned to different focus groups, either according to a pattern or randomly in the array. FIG. 6 shows eight focus groups A-H, with corresponding focus distances $f_1$-$f_8$. FIG. 6 further shows an example microlens array 2210, with the microlenses 2212 in the array configured to provide focus distances $f_1$-$f_8$. The VCSELs 2202 in a given focus group correspond to microlenses 2212 in the array 2210 at a given focus distance. For example, the VCSELs 2202 in focus group A correspond to the microlenses 2212 with focus distance $f_1$, and the VCSELs 2202 in focus group D correspond to the microlenses 2212 with focus distance $f_4$. Note that the microlenses 2212 in the array 2210 may be shifted with respect to the center/optical axis so that the light beams emitted by the VCSELs 2202 in a group and refracted by the respective microlenses 2212 appear as a point source at the collimating lens.

To focus a given pixel in an image at a depth indicated by the image's depth information (e.g., depth map), a controller of the direct retinal projector selectively activates the focus group of VCSELs 2202 corresponding to that depth. The activated VCSELs 2202 emit light beams that pass through and are shifted by the corresponding microlenses 2212 and focused at the respective focal distance. For example, FIG. 6 shows the VCSELs 2202 in focus group D activated to emit light beams through corresponding microlenses 2212 that shift and focus the light beams at focus distance $f_4$. While not shown in FIG. 6, in some embodiments some of the light beams emitted by the VCSELs 2202 in a focus group may pass through frequency conversion elements to provide blue and/or green light frequencies for the respective pixels as illustrated in FIGS. 5A and 5B.

Figure 7:
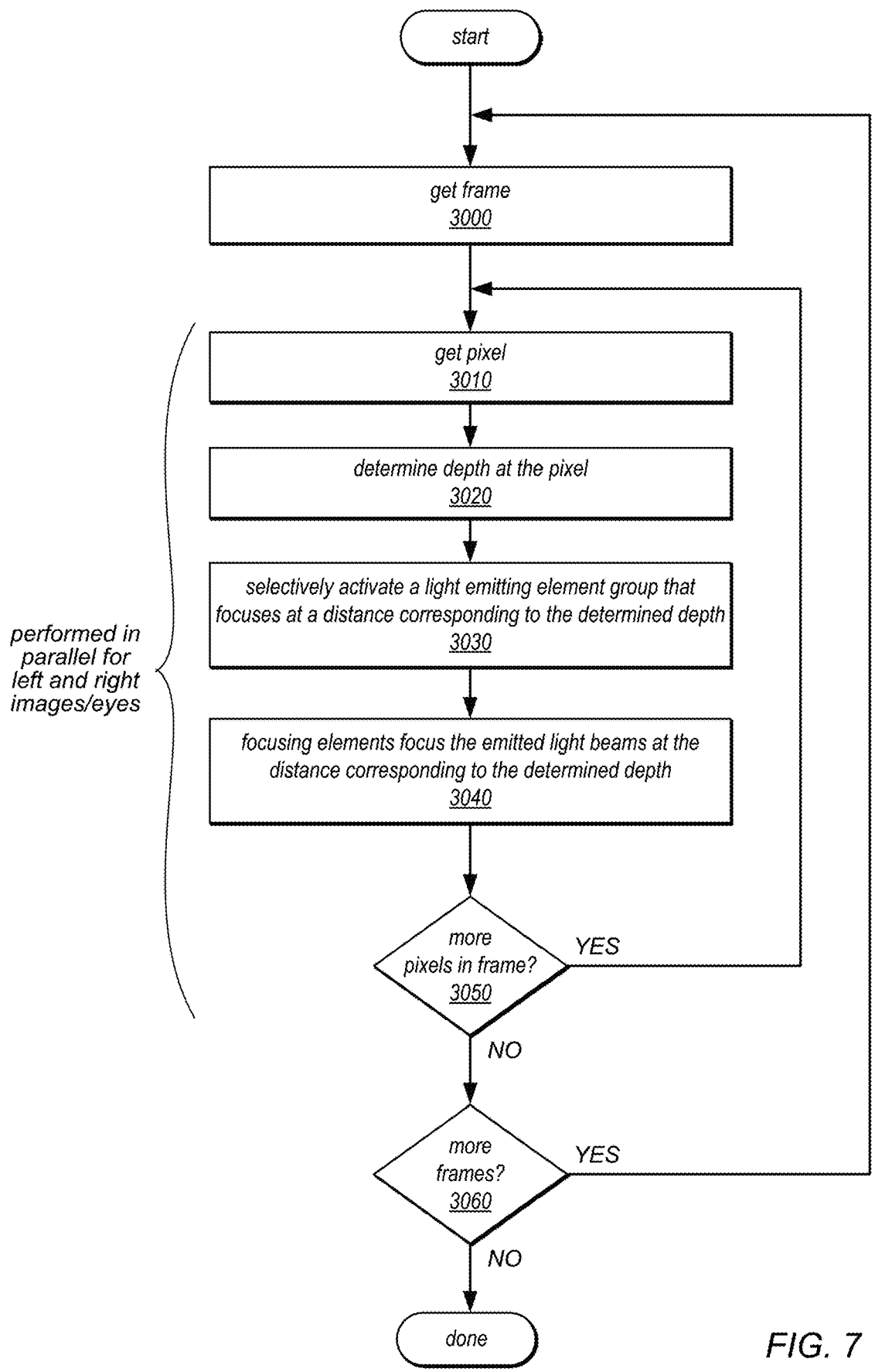
FIG. 7 is a high-level flowchart of a method for focusing pixels at different depths in a direct retinal projector, according to some embodiments.

FIG. 7 is a high-level flowchart of a method for dynamically focusing pixels at different depths in a direct retinal projector, according to some embodiments. The method of FIG. 7 may apply to the components of a direct retinal projector system as illustrated in FIGS. 3A through 6, as well as to an example direct retinal projector system as illustrated in FIGS. 8 through 17 and the section titled Example virtual reality device.

As indicated at 3000, a frame containing a 3D scene to be scanned to a subject's eyes may be obtained, for example by a controller component of the direct retinal projector system. The frame may include two images, i.e. a left and right image as illustrated in FIG. 3A, with content in the images shifted to provide a 3D effect when projected to the subject's eyes. Objects at different depths are shifted different distances, with nearer objects shifted more than more distant objects. As illustrated in FIG. 3A, depth map(s) for the images that indicate depth at the pixels within the images may also be obtained, or alternatively may be dynamically generated by the controller component from shift data obtained from the two images. In some embodiments, for example, the controller component may generate depth maps for a next frame while scanning a current frame.

Elements 3010 through 3040 of FIG. 7 may be performed in parallel and synchronously for the two images by two sets of components in the direct retinal projector system under control of a controller component so that corresponding pixels in the two images are scanned to the subject's respective eyes substantially at the same time.

As indicated at 3010, a next pixel to be scanned may be obtained by the controller component. As indicated at 3020, the controller component may determine a depth at the current pixel, for example by reading a corresponding location in a respective depth map. As indicated at 3030, the controller component determines a group of light emitting elements that focus at a distance corresponding to the determined depth for the current pixel, and selectively activates the light emitting elements in the determined focus group according to the color (e.g., RGB), intensity/brightness, and other information for the current pixel. As indicated at 3040, the light beams emitted by the activated light emitting elements in the focus group are focused by respective focusing elements at the distance that corresponds to the determined depth for the current pixel. For example, the light beams may pass through and be focused by microlenses in a microlens array that correspond to the light emitting elements in the focus group as illustrated in FIGS. 5B and 6. While not shown, if the light emitting elements are VCSELs, at least some of the light beams may be converted from the red frequency to blue and green frequencies using frequency conversion elements such as NdF3 crystals.

At 3050, if there are more pixels in the frame to be scanned, then the method returns to element 3010 to scan the next pixel. Otherwise, at 3060, if there are more frames to be projected, then the method returns to element 3000 to project the next frame. Otherwise, the method is done.

FIGS. 8 through 17 and the section titled Example virtual reality device describe embodiments of a virtual reality device (e.g., headset) that provide direct retinal projection and that may implement or incorporate embodiments of the dynamic focusing components and techniques for direct retinal projector systems as illustrated in FIG. 3A through 7, and various other methods and apparatus for direct retinal projector systems as described herein. However, note that embodiments of the dynamic focusing components and techniques as described herein may be implemented in various other direct retinal projector systems, in other AR or VR technology systems, or in other types of scanning projection systems.

Direct Retinal Projector System

In embodiments of a direct retinal projector system for AR and/or VR applications as described herein, a light beam is generated by a scanning projector, reflected off a curved mirror (e.g., a curved ellipsoid mirror) in front of the subject's eye and through the subject's pupil, and forms an image on the subject's retina—there is no intermediate image on a screen or surface that the subject views. In some embodiments, with relatively small diameter laser beams, the effective depth of focus of the eye can be greatly increased. The direct retinal projector system may at least partially eliminate eye lens accommodation from the retinal projection focus to help eliminate the accommodation convergence mismatch. In some embodiments, the direct retinal projector system may help compensate for user eye lens problems, such as short- or long-sightedness.

Example Direct Retinal Projection Virtual Reality Devices

Embodiments of a virtual reality device (e.g. headset) are described that provide direct retinal projection and that may implement or incorporate embodiments of the scan tracking system, adjustable focus element, and other methods and apparatus for direct retinal projector systems as described above. In some embodiments, the direct retinal projection technology may include a light emitting device that may include one or more light emitting elements (e.g., lasers, LEDs, etc.) configured to generate one or more collimated light beams. A processor connected to the light emitting device may be configured to selectively activate one or more groups of the light emitting elements. A scanning mirror may include one or more microelectromechanical systems (MEMS) mirrors. Each MEMS mirror of the scanning mirror may be configured to dynamically tilt in at least one of two orthogonal degrees of freedom in response to instructions received from the processor. Each MEMS mirror may also be configured to raster scan the light beams over multiple angles corresponding to a field of view of an image. A curved mirror may include curves in two orthogonal directions configured to reflect the collimated light beams from the scanning mirror into a subject's eye in proximity to the curved mirror.

In some embodiments, a VR/AR system may include light emitting devices that each include one or more light emitting elements, for example lasers (e.g., vertical cavity surface-emitting lasers (VCSELs)), and respective focusing and/or collimation optical elements (e.g., lenses). While embodiments are generally described as using lasers such as VCSELs, other types of light emitting elements, for example light emitting diodes (LEDs), may be used in some embodiments. The light emitting elements may be grouped into laser modules, for example with each group or module including at least one red light emitting element, at least one blue light emitting element, and at least one green light emitting element. In some embodiments, diameter of each of the collimated light beams may less than sixty (60) micrometers. In some embodiments, the curved mirror may be an ellipsoid mirror. In some embodiments, the curved mirror may include a partially-reflective layer configured to transmit at least a portion of external light through the curved mirror to the eye, where the external light is incident on an opposite surface of the curved mirror relative to the collimated light beams incident on the internal surface of the curved mirror. In some embodiments, the system may include one or more gaze tracking modules configured to monitor the orientation of one or more eyes and transmit the eye orientation data to the processor, where the processor is configured to dynamically select one or more active portions of the light emitting device and the scanning mirror based at least on the eye orientation data and a respective field of view corresponding to the one or more active portions of the light emitting device and the scanning mirror. In addition to compensating for the subject's eye orientation (e.g., where the subject is looking), the gaze tracking technology may compensate for differences in spacing between different subject's eyes.

In some embodiments, a method for a VR/AR device may include generating, by a light emitting device that may include one or more light emitting elements (e.g., laser modules), one or more collimated light beams. The method may also include selectively activating, by a processor connected to the light emitting device, one or more groups of the light emitting elements. In some embodiments, the method may include dynamically tilting, by the processor, each of one or more microelectromechanical systems (MEMS) mirrors of a scanning mirror in at least one of two orthogonal degrees of freedom. Additionally, the method may include raster scanning, by the scanning mirror, the collimated light beams over multiple angles corresponding to a field of view of an image. Furthermore, the method may include reflecting, by a curved (e.g., ellipsoid) mirror that may include curves in two orthogonal directions, the collimated light beams from the scanning mirror into a subject's eye in proximity to the curved mirror. In some embodiments, the method may include generating, by the collimated light beams, a virtual reality view that may include the image. In some embodiments, the raster scanning may include generating, by the collimated light beams and over a second set of multiple angles, a second field of view in response to a determination, by the processor and based on the eye orientation data, that the eye has moved to a second orientation. In some embodiments, the method may include generating, by the collimated light beams, an augmented reality view that may include virtual images generated by the collimated light beams combined with a real-world view provided by external light that passes through the curved mirror.

In some embodiments, a VR/AR device may include a frame configured to be worn on the head of a user (also referred to as a subject). In some embodiments, the device may include first and second light emitting devices connected to the frame, where the first and second light emitting devices may include respective first and second sets of light emitting elements configured to generate respective first and second sets of collimated light beams. A processor connected to the first and second light emitting devices may be configured to selectively activate one or more groups of the respective ones of the first and second sets of light emitting elements. First and second scanning mirrors connected to the frame may include respective sets of one or more microelectromechanical systems (MEMS) mirrors. Each MEMS mirror of the first and second scanning mirrors may be configured to dynamically tilt in at least one of two orthogonal degrees of freedom in response to instructions received from the processor. Each MEMS mirror of the first and second scanning mirrors may also be configured to raster scan the light beams over multiple angles corresponding to a field of view of an image. First and second curved (e.g., ellipsoid) mirrors connected to the frame may each include curves in two orthogonal directions. The first curved mirror may be configured to reflect the first set of collimated light beams from the first scanning mirror into a first eye in proximity to the first curved mirror. The second curved mirror may be configured to reflect the second set of collimated light beams from the second scanning mirror into a second eye in proximity to the second curved mirror.

Direct Retinal Projection Virtual Reality Headset Details

Embodiments of a virtual reality device (e.g., headset) may implement direct retinal projection as described herein to, for example, solve problems with respect to accommodation-convergence mismatches when generating VR and/or AR image(s) by scanning narrow collimated beams of light directly to the retinas of a subject's eyes. In various embodiments, the narrow collimated beams of light may be produced by scanning one or more light sources (e.g., red, green, blue (RGB) lasers) into the subject's eye(s), thereby producing a light field corresponding to the VR and/or AR image(s). In some embodiments, a small beam diameter (e.g., a beam diameter smaller than the pupil of the subject's eye) may enable the system to produce a larger depth of focus and reduce the impact of eye accommodation. For example, the use of parallel beams having small beam diameters may reduce accommodation-convergence mismatch and thus help correct eye problems. In some embodiments, the focus of one or more light beams may be adjusted through a slow axis scan, thereby maintaining beam collimation and/or divergence.

In some embodiments, a VR and/or AR headset system may reduce and/or eliminate accommodation-convergence mismatch problems by scanning narrow collimated beams of light to generate a light field at the subject's eyes. In some embodiments, an F-number calculation for such a system may be described as follows. If a human eye has a focal length of 17 mm at infinity and a focal length of 15.7 mm at a 200 mm focus, then a hyperfocal distance (h) may be approximately equal to 1500 mm. This may ensure an optimal focus over the depth of field of 750 mm to infinity. Assuming a visual acuity of approximately 1 arc minute, this corresponds to a notional "pixel" size of 5 micrometers (µm) (i.e., p), and thus the F-number would be defined by the equation: F-number=$f^2/(h*p)$=38.5, which would result in a required aperture of 440 micrometers (µall). Therefore, a beam diameter of 440 µm entering a subject's eye may provide visual acuity for object distances from 750 mm to infinity, regardless of how the internal lens of the subject's eye is accommodated. The angle of a light beam entering the subject's eye is an important factor in determining the placement of the light with respect to the image seen by the subject's eye, while the position of the light beam with respect to the pupil itself may not be an important factor. Such a system could thus be configured to provide VR and/or AR images to the eyes of the subject while maintaining the subject's comfort. An additional benefit of such a system is that the system may be configurable to adapt to and correct a subject's existing eye problems (e.g., long-sightedness, short-sightedness, or a general reduced ability for accommodation), while still allowing sharp, high-resolution images to be received on the subject's retina.

In some embodiments, a laser module (e.g., a laser module suitable for use in a projector system) may be utilized in a VR/AR device (e.g., headset system). In some embodiments, a laser module may include three separate lasers with different colors, such as red, green, and blue. While embodiments are generally described as using lasers (e.g., VCSELs), other types of light emitting elements, for example light emitting diodes (LEDs), may be used in some embodiments. Beam splitters and reflectors may also be used to superpose the beams emitted by the lasers to a single RGB beam, which may then be scanned using a scanning mirror. In some embodiments, the scanning mirror may be a two-dimensional (2D) microelectromechanical (MEMS) mirror. In some embodiments, the scanning mirror may be a three-dimensional (3D) MEMS mirror. In some embodiments, a single laser module and a single adjustable scanning mirror may be used (with one set for each eye). In some embodiments, an array of MEMS mirrors may be used to raster scan multiple light beams from an array of laser modules (with two sets of laser/mirror arrays, one for each eye). In some embodiments, the scanning mirror may be placed at or close to one of the foci of a curved mirror, such as an ellipsoid mirror, and the pupil of the subject's eye may be positioned at or close to the other focus of the curved mirror. In such a system, the scanning mirror may be scanned to direct light from the laser modules into the subject's eye and thereby generate a light field corresponding to one or more VR images or AR images. In some embodiments, during a raster scan each laser may be appropriately modulated based at least in part on the desired intensity and color of each location in the projected image.

In some embodiments, a VR headset may continue to focus a light field into the eye of a subject across multiple potential pupil positions. If the subject's pupil moves with respect to the azimuth (i.e., horizontal angle), the subject's pupil may no longer be at a focus of the ellipsoid mirror, and the rays corresponding to the light field may no longer focus to a point. However, so long as the beams converge sufficiently to enter the subject's pupil, the collimated light beams may be correctly focused onto the retina of the subject's eye. As stated above, parallel beams of light entering the subject's pupil land on the retina at the same place, and consequently the position, to the first order, of the beam within the subject's pupil may not be relevant to the focus of the collimated light beams on the subject's retina.

In some embodiments, a laser aperture of approximately 2 millimeters (mm) to 3 mm may be utilized. At the diffraction limit, such a laser may be capable of an angular resolution at the subject's eye of approximately 3 arc minutes for a 2 mm aperture and 2 arc minutes for a 3 mm aperture. For reference, 20/20 vision roughly corresponds to 1 arc minute. Such a laser may also be capable of a hyperfocal distance of 1 meter (m) for a 2 mm aperture and 2.5 m for a 3 mm aperture. Therefore, for a 2 mm aperture, the image at the subject's eye may be in focus on the subject's retina if accommodated from 0.5 m to infinity. Similarly, for a 3 mm aperture, the image at the subject's eye may be in focus on the subject's retina if accommodated from 1.3 m to infinity.

In some embodiments, diffraction limit calculations may be based on the far-field estimate of the beam parameter product (BPP). BPP corresponds to $(\Delta x)*\Delta\alpha/4 \geq \lambda/\pi$, where $\Delta x$ is the beam width; $\Delta\alpha$ is the beam divergence angle; $\lambda$, is the light wavelength; and $\lambda/\pi$ is the diffraction limit (0.175 mm mrad for 550 nm light). The Fresnel number $(N)=(\Delta x)^2/(\lambda*L)$ indicates whether the beam is in the near field or far field, where L is the distance from the aperture to the point of interest. In some embodiments, L may be approximately 127 mm, although this is just an example and should not be considered to be limiting. As example values of N, for a 2 mm aperture N may be approximately 14, and for a 3 mm aperture N may be approximately 32. Values of N<0.2 may correspond to a far-field where the beam may be assumed to be Gaussian. If N>100, diffraction effects may be ignored.

In the above discussion of the range of N, the Fresnel diffraction region and the near field are assumed. Thus, the diffraction limit equations used in the discussion are not correct, as beam divergence $(\Delta\alpha)$ is not defined for the near field. In practice, however, the beam performance may be better than predicted by the far field numbers.

The techniques described herein for a VR/AR device may be further illustrated in terms of an example VR/AR headset system that employs them. As noted above, these techniques may be implemented in any type of display device, apparatus, optical projection system, or computing system that includes the capability to process and display image and/or video data.

One example of a system that is configured to implement any or all of the techniques described herein is illustrated in FIG. 8. For example, system 400 illustrated in FIG. 8 may be configured as a virtual reality headset, according to some embodiments. In the illustrated embodiment, system 400 includes light emitting devices 405A-B coupled to controller 425, scanning mirrors (e.g., MEMS mirror arrays) 410A-B coupled to controller 425, one or more gaze tracking module(s) 445A-B coupled to controller 425, a memory 430, a power supply 440, and one or more input/output (I/O) device(s) 450. As depicted, system 400 also includes a left curved mirror 415A and a right curved mirror 415B, which are configured to reflect collimated light beams 407A into a subject's left eye 420A and to reflect collimated light beams 407B into a subject's right eye 420B, respectively.

In this example, light emitting devices 405A-B may include any type of light emitting elements suitable for emitting light beams, such as edge emitting lasers, vertical cavity surface emitting lasers (VCSELs), light emitting diodes (LEDs), or other devices. In some embodiments, light emitting devices 405A-B may be configured to generate and/or modulate collimated light beams 407A and 407B, respectively. In some embodiments, light emitting devices 405A-B may be configured to dynamically focus each pixel in VR images as the images are being scanned to a subject's eyes, thus allowing content. that are intended to appear at different depths in a scene to be projected to the subject's eyes at the correct depths. In some embodiments, light emitting devices 405A-B may be positioned (e.g., on a frame holding the various elements of system 400), such that light emitting devices 405A-B are oriented to emit collimated light beams at least in the direction(s) of scanning mirrors 410A and 410B, respectively. Various examples of light emitting devices are illustrated in FIGS. 3A-7, 9, 12, 13, and 15. An example of a frame for system 400 is illustrated in FIG. 14, which is discussed in detail below.

In some embodiments, scanning mirrors (e.g., MEMS mirror arrays) 410A-B may be positioned and/or oriented (e.g., on a frame holding the elements of system 400) such that scanning mirrors 410A-B are located at or close to focal points of curved mirrors 415A and 415B, respectively. In some embodiments, controller 425 may selectively control and/or adjust the positions of one or more movable mirror elements in each of scanning mirrors 410A-B in order to generate a raster scan of collimated light beams 407A-B, respectively, into a light field that may be reflected from curved mirrors 415A-B, respectively, and into the subject's eyes 420A-B, respectively. In some embodiments, the subject's eyes 420A-B may be positioned at or near to focal points of curved mirrors 415A-B, respectively. Various examples of scanning mirrors 410A-B and curved mirrors 415A-B are illustrated in FIGS. 9, 10A-10C, 11, 14 15, 16A, and 16B, which are discussed in detail below.

In some embodiments, a light emitting device 405 may include a single laser group or module that includes a red, a green, and a blue laser, and a scanning mirror 410 may include a single MEMS mirror that is used to raster scan a collimated light beam from the light emitting device 405 to generate an image at the subject's respective eye 420. In some embodiments, as illustrated in FIG. 9, a light emitting device 405 may include an array of two or more laser groups or modules, and a scanning mirror 410 may include an array of two or more MEMS mirrors that are used to raster scan multiple collimated light beams from the array of laser modules to generate images at the subject's respective eye 420.

While using the system 400, a subject may move their eyes. In addition, different subject's eyes may be differently spaced. In some embodiments, to avoid distortion in a projected image due to eye orientation and/or spacing, gaze tracking technology may be used to dynamically adjust the virtual image projected by the system 400 according to the subject's current eye orientation and the spacing between the subject's eyes. Gaze tracking module(s) 445A-B may monitor the orientation of the subject's eyes 420A-B and transmit the eye orientation data to the controller 425. The controller 425 may dynamically select one or more active portions of the light emitting device 405 (e.g., one or more laser groups) and of the scanning mirror (e.g., one or more MEMS mirrors) according to the eye orientation data and a respective field of view corresponding to the one or more active portions of the light emitting device and the scanning mirror. In addition to compensating for the subject's eye orientation (e.g., where the subject is looking), the gaze tracking technology may compensate for differences in spacing between different subject's eyes.

In different embodiments, system 400 may include any of various types of devices including, but not limited to: a personal computer system; a laptop computer; a notebook, tablet, slate, or netbook computer; a handheld computer; a mobile device, such as a mobile phone, tablet device, or music player; a video game console; a handheld video game device; or in general any type of computing or electronic device that includes the functionality of generating images for a virtual reality and/or augmented reality system. In some embodiments, system 400 or controller 425 may include more or fewer elements than those shown in FIG. 8.

In various embodiments, controller 425 may be a uniprocessor system including one processor, or a multiprocessor system including several processors (e.g., two, four, eight, or another suitable number). Controller 425 may include central processing units (CPUs) configured to implement any suitable instruction set architecture, and may be configured to execute instructions defined in that instruction set architecture. For example, in various embodiments controller 425 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 425 may employ any microarchitecture, including scalar, superscalar, pipelined, superpipelined, out of order, in order, speculative, non-speculative, etc., or combinations thereof. Controller 425 may include circuitry to implement microcoding techniques. Controller 425 may include one or more processing cores each configured to execute instructions. Controller 425 may include one or more levels of caches, which may employ any size and any configuration (set associative, direct mapped, etc.).

In the example system 400 illustrated in FIG. 8, memory 430 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 400 in a chip-on-chip configuration, a package-on-package configuration, or a multi-chip module configuration. In some embodiments, system memory 430 may store pixel data or other image data or statistics in various formats. Similarly, while the example system 400 illustrated in FIG. 8 includes persistent storage for non-volatile storage of image data or other data used in the system, in other embodiments, the system may include other types of non-volatile memory (e.g. read-only memory (ROM)) for those purposes. In some embodiments, memory 430 may include data, such as a program instructions 435 and/or one or more representative maps used by an image signal processor to identify, process, and thereby generate collimated light beams configured to produce a light field corresponding to VR and/or AR image data. One embodiment of an implementation of program instructions 435 is illustrated in more detail in FIG. 17 and described below.

Controller 425 may include a graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. The amount of hardware and software implementation may vary from embodiment to embodiment.

I/O devices 450 may include any desired circuitry, depending on the type of system 400. For example, in some embodiments, system 400 may be configured to interface with a mobile computing device (e.g. personal digital assistant (PDA), tablet device, smart phone, etc.), and the I/O devices 450 may include devices for various types of wireless communication, such as WiFi, Bluetooth, cellular, global positioning system, etc. In some embodiments, I/O devices 450 may also include additional storage, including RAM storage, solid state storage, or disk storage. In some embodiments, I/O devices 450 may include user interface devices such as additional display devices, including touch display screens or multi-touch display screens, power buttons, input buttons, control keys, keyboards, keypads, touchpads, scanning devices, voice or optical recognition devices, microphones, speakers, scanners, printing devices, or any other devices suitable for entering or accessing data by or within system 400.

In some embodiments, controller 425 may include an image signal processor (ISP), which may include dedicated hardware that may facilitate the performance of various stages of an image processing pipeline. In some embodiments, controller 425 and/or an ISP may be configured to receive image data from an external source and/or from one or more data files stored in memory 430 and to process the data into a form that is usable by other components of system 400 (including light emitting devices 405A-B, scanning mirrors 410A-B, gaze tracking modules 445A-B, program instructions 435, and/or I/O devices 450). In some embodiments, controller 425 and/or an ISP may be configured to perform various image procession and manipulation operations including one or more of, but not limited to, image translation operations, horizontal and vertical scaling, non-uniformity correction, filtering, non-uniformity reduction, color space conversion or other non-warping image editing operations, or image stabilization transformations.

Those skilled in the art will appreciate that system 400 is merely illustrative and is not intended to limit the scope of embodiments. For example, system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available. In some embodiments program instructions 435 stored in memory 430 may be executed by controller 425 to provide various functions of system 400.

In some embodiments, various functions may be performed by software components executing in memory on another device and communicating with the illustrated system via inter-computer communication. Some or all of these software components or any data structures described herein may be stored (e.g., as instructions or structured data) in system memory 430, in persistent storage, or may be stored on a non-transitory computer-readable medium or a portable article to be read by an appropriate drive connected to I/O device(s) 450. In some embodiments, instructions stored on a computer-accessible medium separate from system 400 may be transmitted to system 400 via transmission media or signals such as electrical, electromagnetic, or digital signals, conveyed via a communication medium such as a network or a wireless link. Various embodiments may further include receiving, sending or storing instructions or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

Figure 16A:
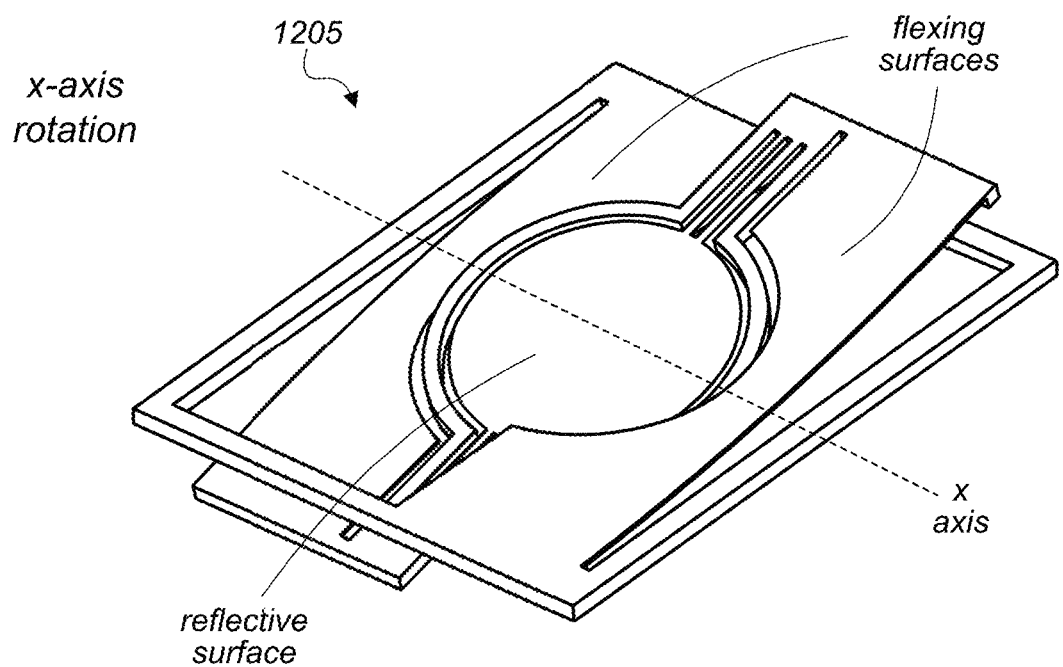
FIGS. 16A and 16B illustrate a dynamically adjustable MEMS mirror that may be used in a VR/AR device, according to some embodiments.
Figure 16B:
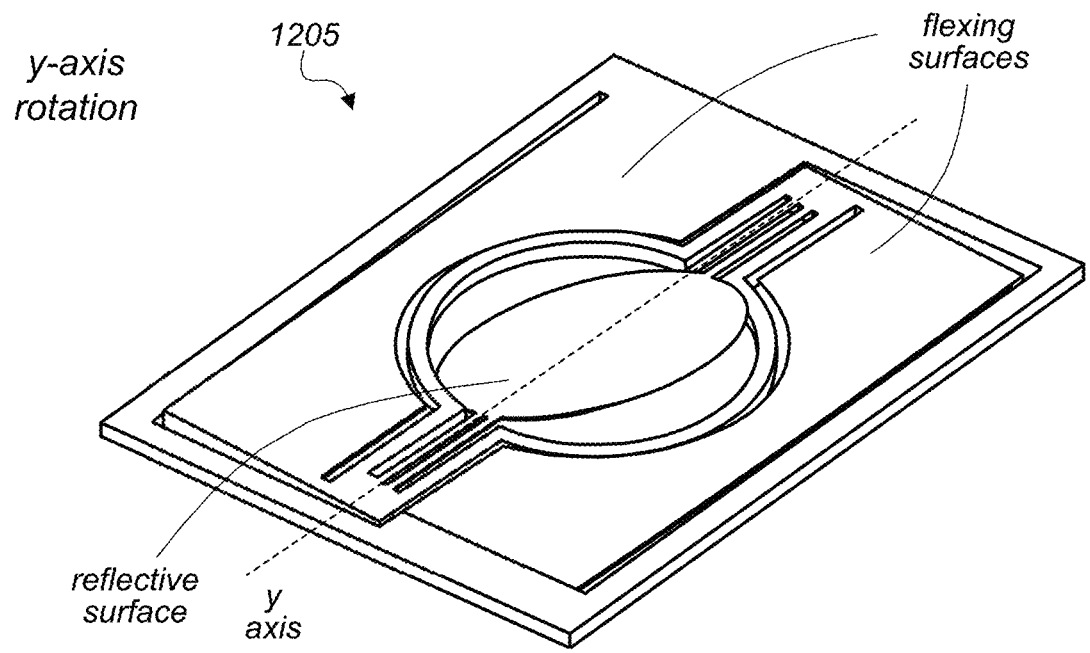

FIG. 9 is an example of a raster scan using an array of MEMS mirrors, according to some embodiments. In some embodiments, a light emitting device 405A may be configured to, under direction of controller 425, emit light beams for pixels being scanned that are dynamically focused at different focus distances according to depth information for the images being scanned, for example as illustrated in FIGS. 3A-7. In some embodiments, MEMS mirrors 510A-N may be configured to tilt according to commands received from controller 425, thereby selectively reflecting collimated light beams received from collimating lens 520 across multiple scan angles 515A-N directed towards curved mirror 415A and ultimately into the subject's eye 420A. In some embodiments, each MEMS mirror 510 may be configured to tilt in at least two directions, and the two directions may be orthogonal (e.g., an x-axis and a y-axis). Examples of MEMS mirror 510 tilt configurations are depicted in FIGS. 16A and 16B, which are described in detail below.

Figure 10A:
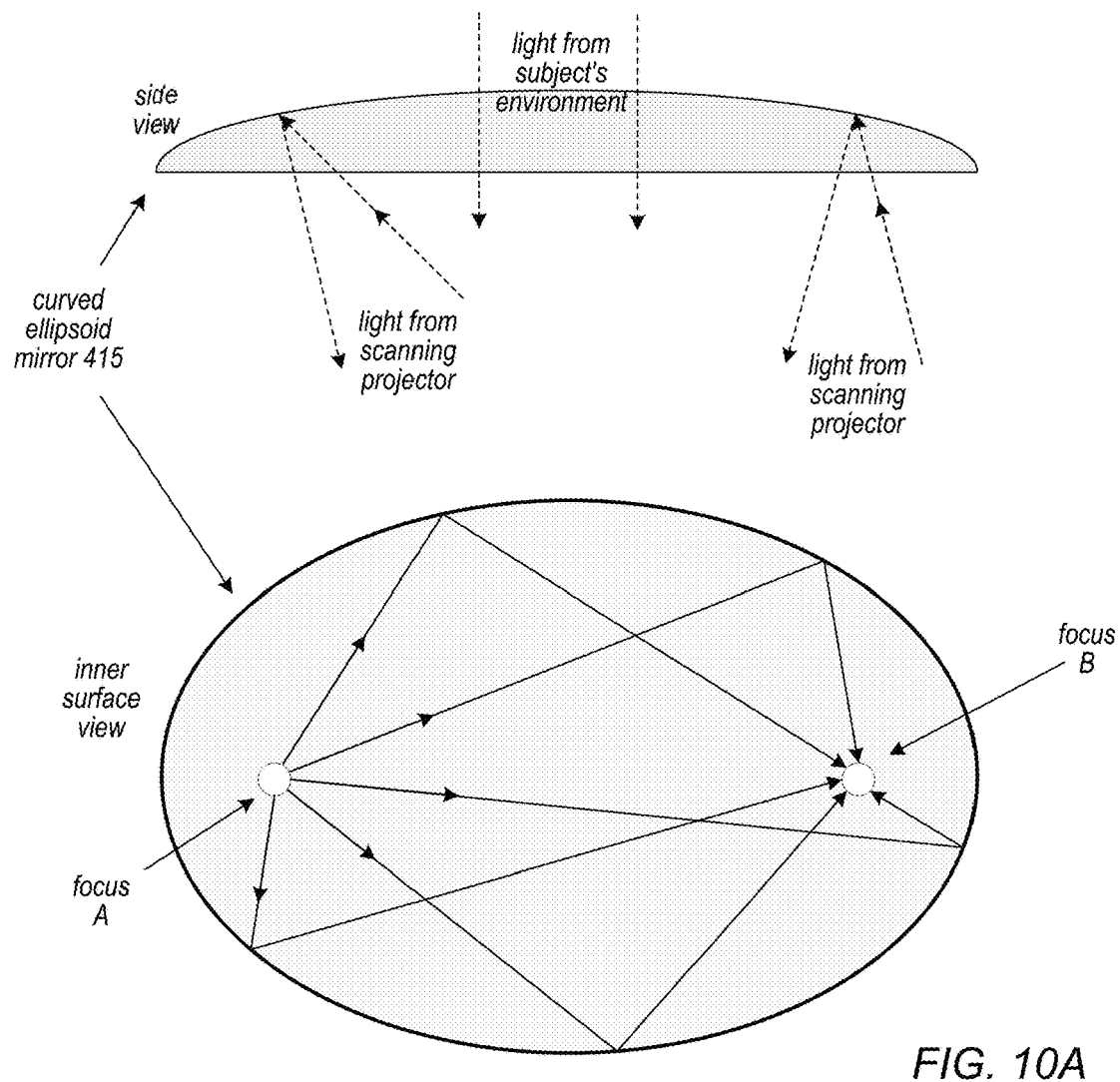
FIG. 10A illustrates a curved, substantially ellipsoid mirror, according to some embodiments.

FIG. 10A illustrates a side view and an inner surface view of a curved ellipsoid mirror 415, according to some embodiments. The curved ellipsoid mirror 415 reflects and focuses the light field from the scanning mirror into the subject's eye pupil, thus simplifying the optics and reducing the scanning degrees of freedom required when compared to conventional systems. In some embodiments, the curved ellipsoid mirror 415 may be "see through", i.e. allowing at least some light from the subject's environment to pass through, thus enabling a much more natural augmented reality (AR) experience. For example, AR content projected by the direct retinal projector system may be "overlaid" on or viewed in the environmental scene that the subject is viewing.

Figure 10B:
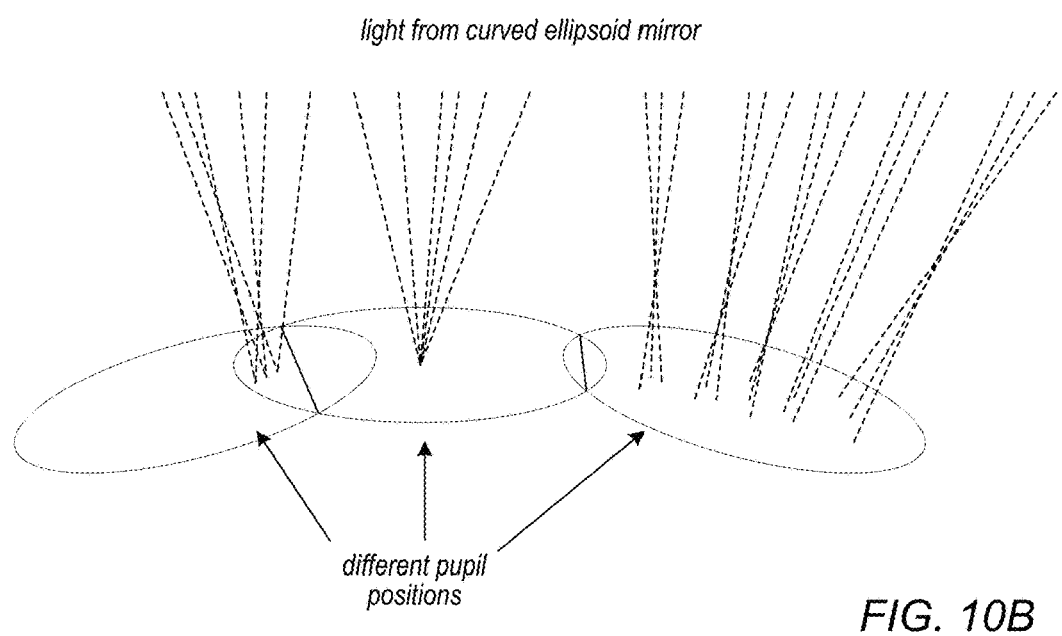
FIG. 10B illustrates light from a curved ellipsoid mirror of a direct retinal projector striking the pupil at different positions, according to some embodiments.

FIG. 10B illustrates light (field rays) from a curved ellipsoid mirror 415 striking the subject's pupil at different positions, according to some embodiments. In some embodiments, the curved ellipsoid mirror only focuses the light field to a point at one pupil position. At other positions, it focuses to a region. As long as the light enters the pupil, it does not matter where it enters. In some embodiments, the curved ellipsoid mirror 415 may be modified from the mathematical ellipsoid shape so as to even up the focus region sizes for different pupil positions.

Figure 10C:
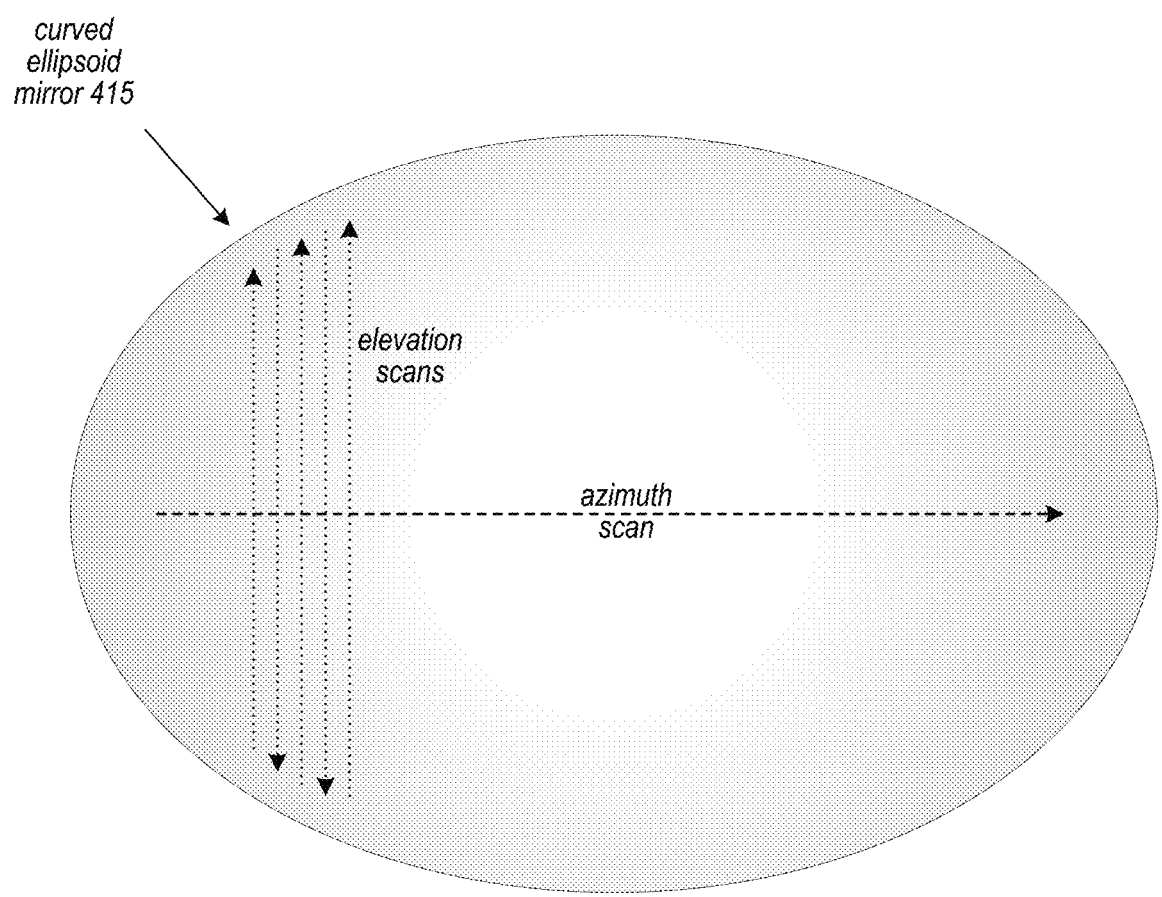
FIG. 10C illustrates elevation and azimuth scans to a curved ellipsoid mirror, according to some embodiments.

FIG. 10C illustrates elevation and azimuth scans to a curved ellipsoid mirror 415, according to some embodiments. In some embodiments, the system 400 may be configured to scan pixels from a source VR or AR image or frame to the curved ellipsoid mirror 415 in a pattern in which the pixels are scanned on the elevation (fast) axis (each elevation scan corresponding to a column of the source image), with the elevation scans proceeding across the curved ellipsoid mirror 415 across the azimuth (referred to as the azimuth, or slow, scan). Note that the directions of the arrows in FIG. 10C are given by way of example, and are not intended to be limiting. VR or AR images or frames may be scanned at a frame rate, e.g. 60 or 90 Hz.

Figure 11:
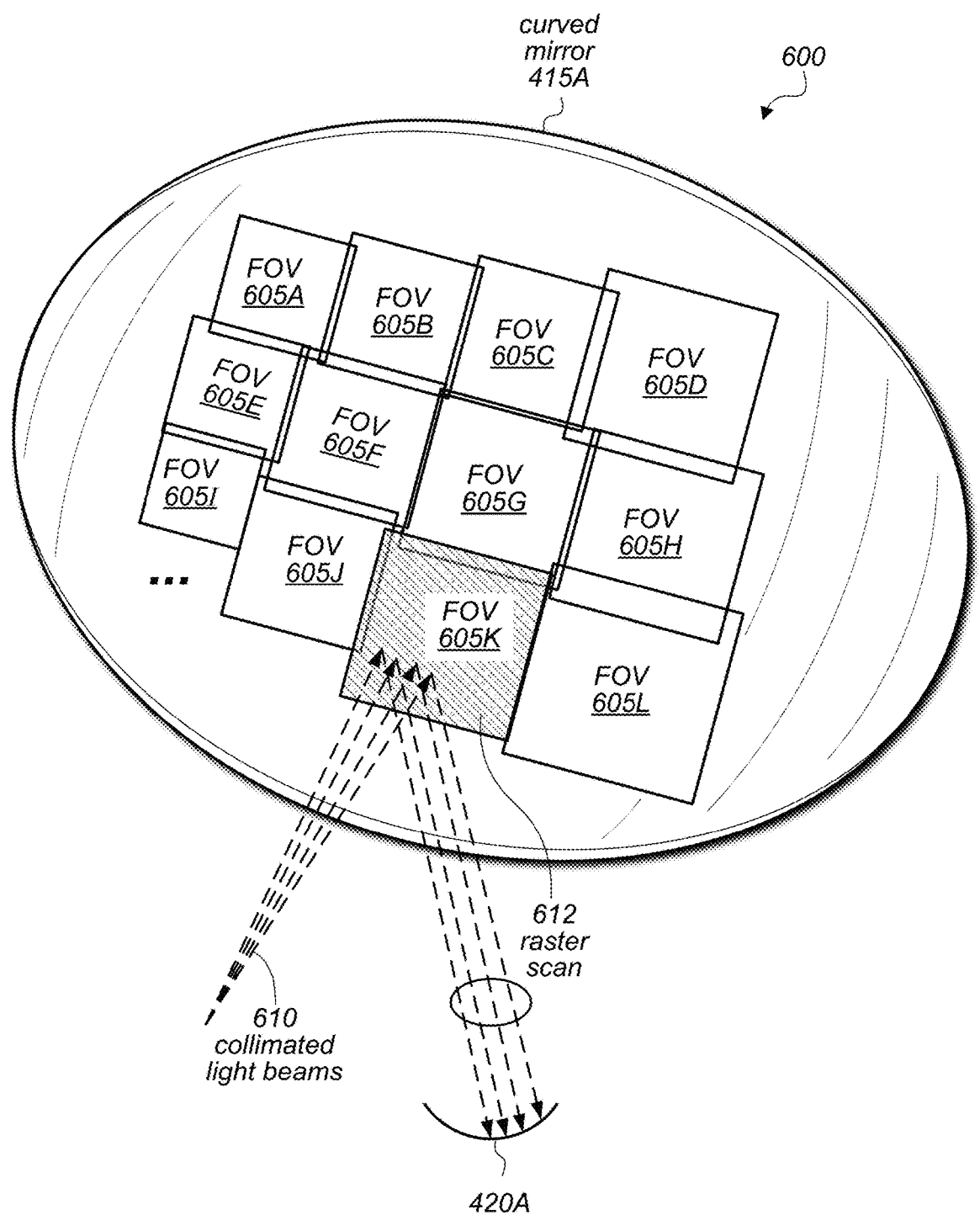
FIG. 11 is a logical block diagram of multiple fields of view, according to some embodiments.

FIG. 11 is an example of multiple fields of view, according to some embodiments. In some embodiments, system 600 may generate collimated light beams 610 that may be raster scanned by a scanning mirror (e.g., a MEMS mirror array as illustrated in FIG. 9) to produce a field of view (FOV), such as FOV 605K of system 600. By selectively modulating one or more light emitting elements (e.g., one or more groupings of RGB lasers) of a respective light emitting device 405, and/or by selectively tilting one or more adjustable mirror elements (e.g., MEMS mirrors) of a respective scanning mirror 410, controller 425 may effectively raster scan collimated light beams 610 across a given FOV, and the FOV may be reflected by curved mirror 415A into a respective eye 420A of the subject. Different MEMS mirror positions in scanning mirrors 410A-B and/or the selective activation of different groups of lasers of the light emitting devices 405A-B may thus accommodate different eye swivel angles as detected by a gaze tracking module 445.

Figure 12:
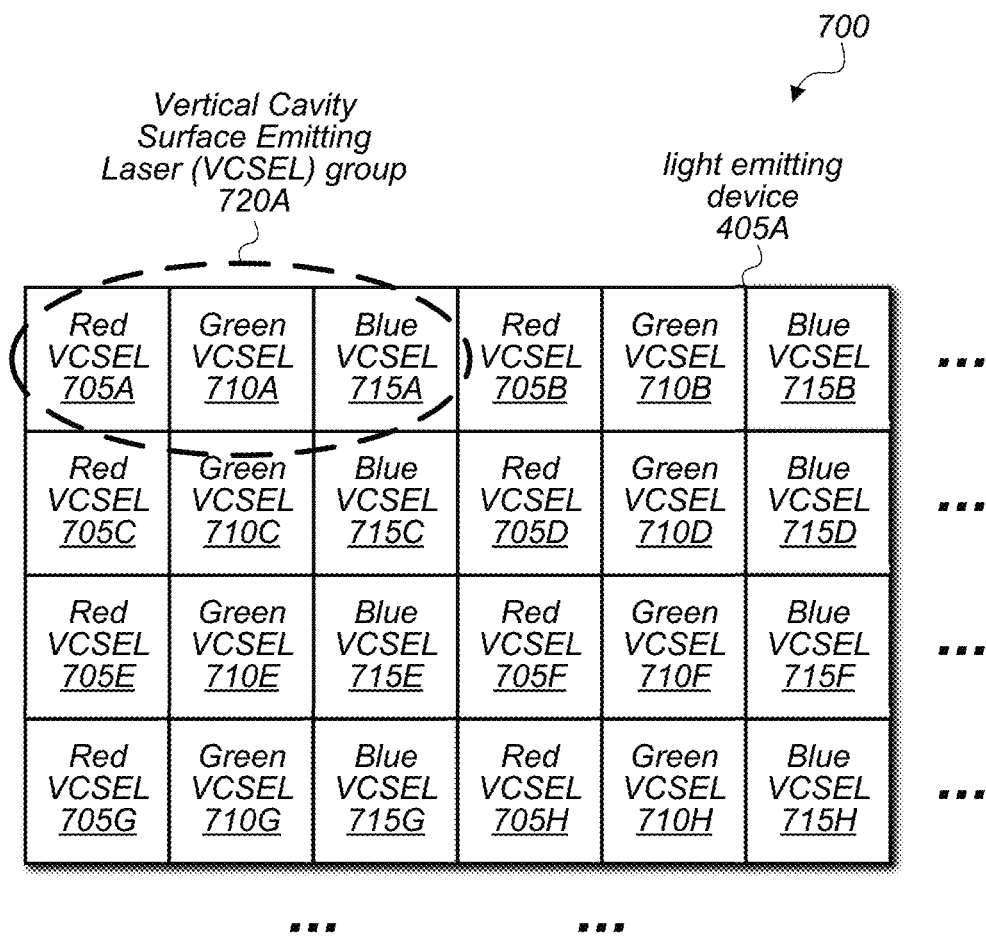
FIG. 12 is a logical block diagram of a configuration of a light emitting device, according to some embodiments.

FIG. 12 depicts an example configuration of a light emitting device, according to some embodiments. As illustrated, system 700 may include light emitting device 405A of FIG. 8. In some embodiments, light emitting device 405A may include multiple VCSEL groups, such as VCSEL group 720A. In some embodiments, each VCSEL group may include multiple colors of lasers (e.g., RGB) usable to generate light corresponding to a pixel pattern of an image. As shown, VCSEL group 720A includes an RGB color pattern having a red VCSEL 705A, a green VSCEL 710A, and a blue VCSEL 715A. In various embodiments, light emitting device 405A may include multiple respective VCSEL groups each configured to represent different pixels of an image and/or different fields of view of a light field. While embodiments are generally described as using VCSELs, other types of light emitting elements, for example light emitting diodes (LEDs), may be used in some embodiments.

Figure 13:
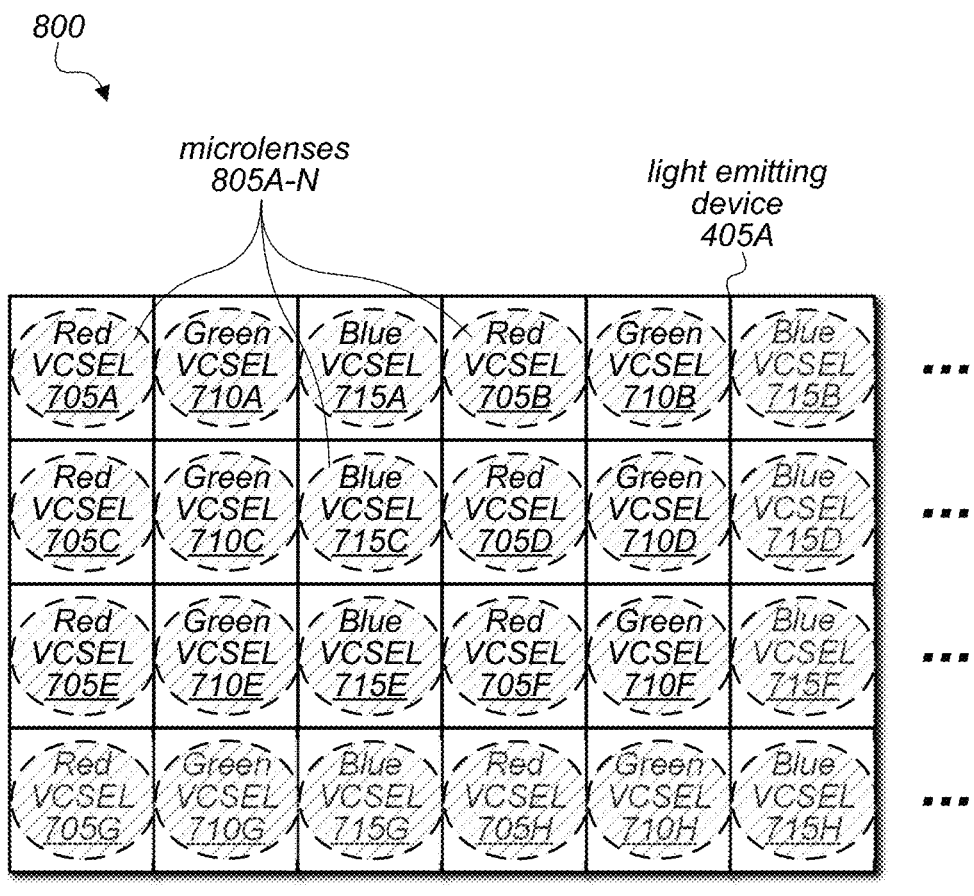
FIG. 13 is a logical block diagram of a light emitting device with microlenses, according to some embodiments.
Figure 14:
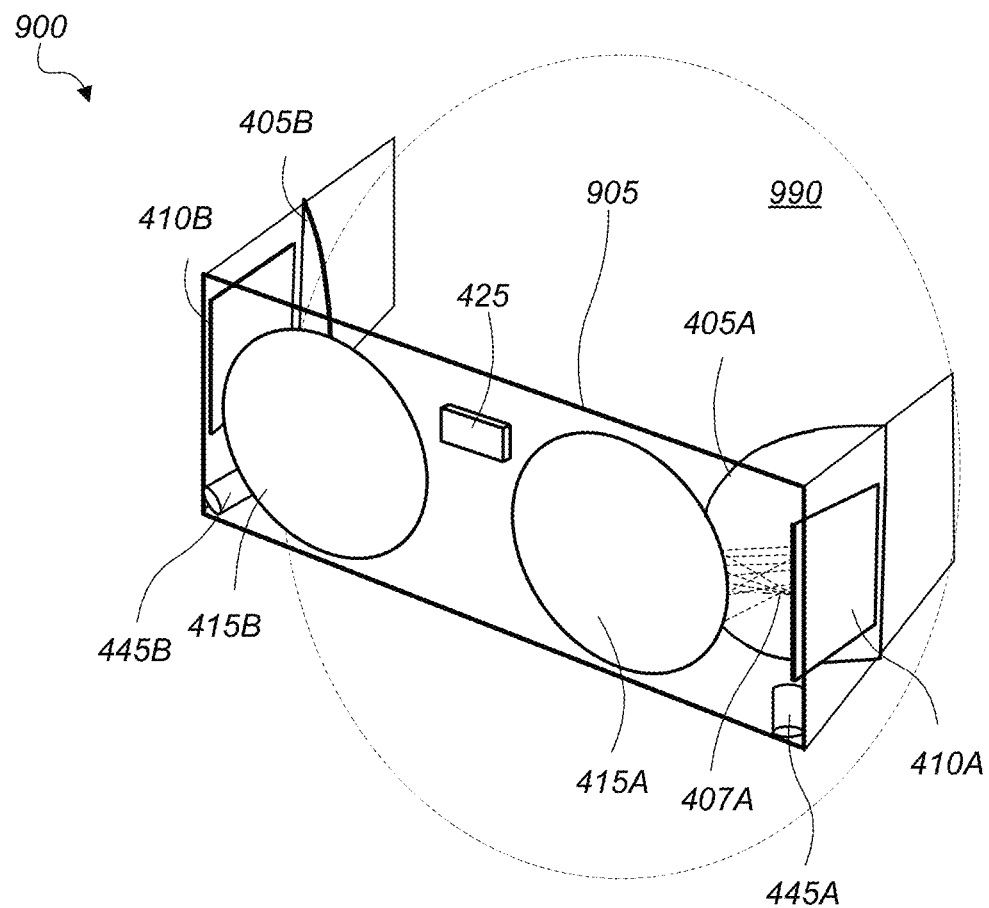
FIG. 14 is a logical block diagram of a frame for a VR/AR device, according to some embodiments.

FIG. 13 illustrates an example of a light emitting device with microlenses, according to some embodiments. As shown, system 800 may include a light emitting device, such as light emitting device 405A of FIG. 8, that includes one or more groups of VCSELs, with an array of microlenses 805A-N positioned at or near the output of the VCSELs. In various embodiments, one or more focusing lenses may correspond to one or more respective VCSELs.

FIG. 14 depicts an example of a system 900 including a frame 905, according to some embodiments. As illustrated, frame 905 may be configured to hold various elements of a VR/AR device, such as the elements of system 400 of FIG. 8. In various embodiments, frame 905 may be a glasses frame, a goggles frame, a helmet, or the like, configured to be worn on or over a subject 990's head so as to position the curved mirrors 415A and 415B in front of the subject 990's left and right eyes, respectively.

Figure 15:
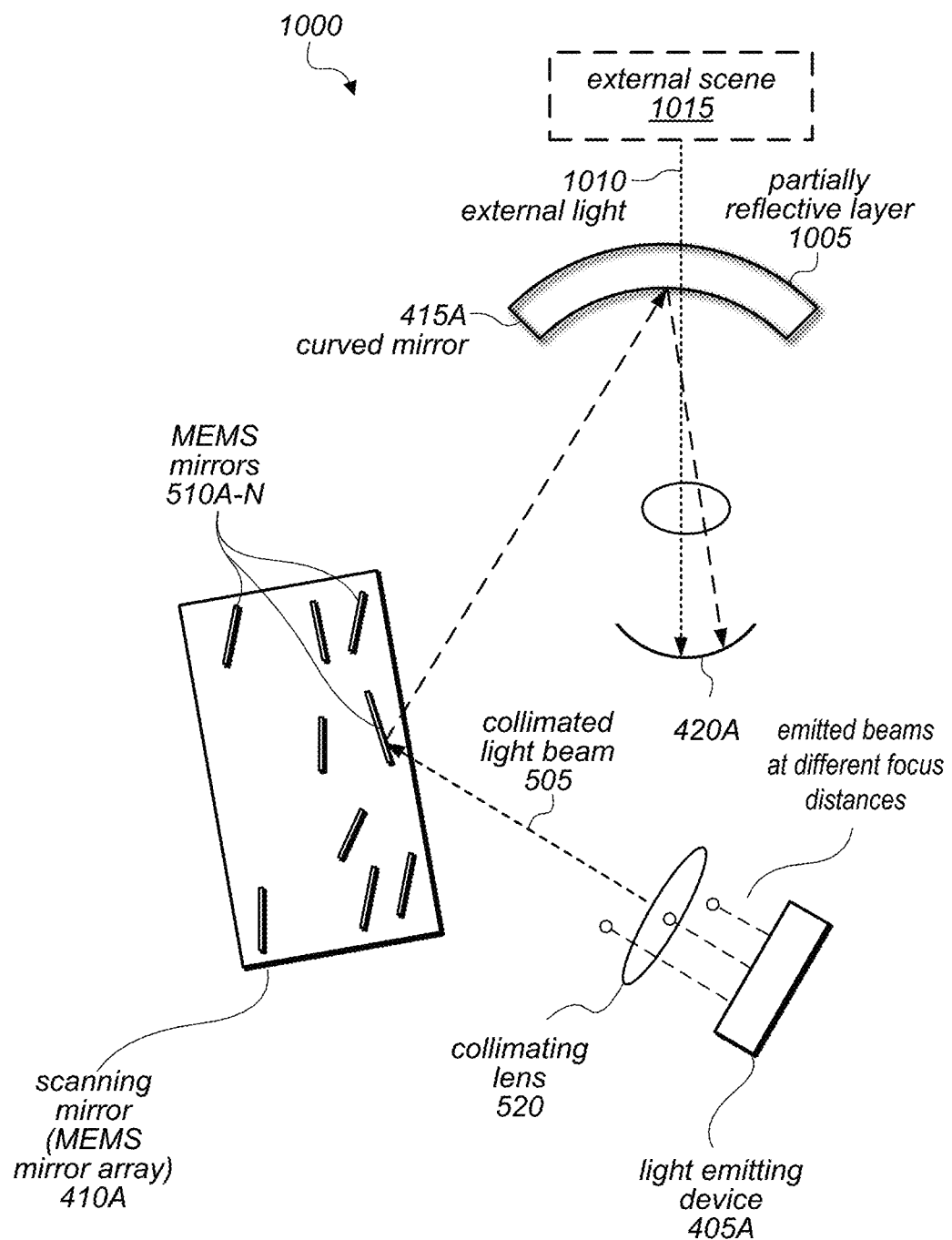
FIG. 15 is a logical block diagram of a device that provides augmented reality (AR) to a subject, according to some embodiments.

FIG. 15 illustrates an example of a system 1000 configured for augmented reality (AR), according to some embodiments. In some embodiments, a curved mirror, such as curved mirror 415A of FIG. 8, may include a partially reflective layer 1005 configured to allow a portion of external light 1010 from an external scene 1015 to pass from an opposite surface of curved mirror 415A through curved mirror 415A and reach the subject's eye 420A, while simultaneously reflecting collimated light beam 505 from an internal surface of curved mirror 415A towards the subject's eye 420A. In various embodiments, partially reflective layer 1005 may be a partially-silvered mirror, or the like. Augmented reality system 1000 thus enables the subject to see elements of both an external scene 1015 and the images corresponding to collimated light beam 505 (i.e., the field of view generated by light emitting device 405A and scanning mirror 410A raster scanning collimated light beam 505 across the inside surface of curved mirror 415A). In some embodiments, the light emitting device 405A may be configured to, under direction of controller 425, emit light beams for pixels being scanned that are dynamically focused at different focus distances according to depth information for the images being scanned, for example as illustrated in FIGS. 3A-7.

FIGS. 16A and 16B illustrate embodiments of dynamically adjustable MEMS mirrors, according to some embodiments. As depicted in FIG. 16A, MEMS mirror 1205 may be configured to rotate a reflective surface across an x-axis based on an electrical current applied to MEMS mirror 1205 that changes the magnetic field(s) of a piezoelectric material applied to the flexing surfaces of the MEMS mirror 1205 in relation to a substrate of the MEMS mirror 1205, thereby causing the flexing surfaces to bend which results in rotating a reflective surface of the MEMS mirror 1205 in relation to the x-axis. Similarly, FIG. 16B depicts a reflective surface of MEMS mirror 1205 rotating across a y-axis in response to an electrical current that differently alters the magnetic field(s) of the piezoelectric material applied to the flexing surfaces of the MEMS mirror 1205, thereby causing the flexing surfaces to differently bend which results in rotating a reflective surface of the MEMS mirror 1205 in relation to the y-axis. In some embodiments, a scanning mirror may include multiple such MEMS mirrors 1205 configured to dynamically rotate in two orthogonal directions in response to commands from a processor.

FIGS. 9-16 provide an example of a direct retinal projector VR/AR device which may generate virtual reality or augmented reality images. However, numerous other types or configurations of systems or components may be included in a direct retinal projector VR/AR device. Further, the various components of a direct retinal projector system as illustrated in FIGS. 3-16 may be included in other types of VR/AR devices than those depicted, or in other types of devices or systems.

Figure 17:
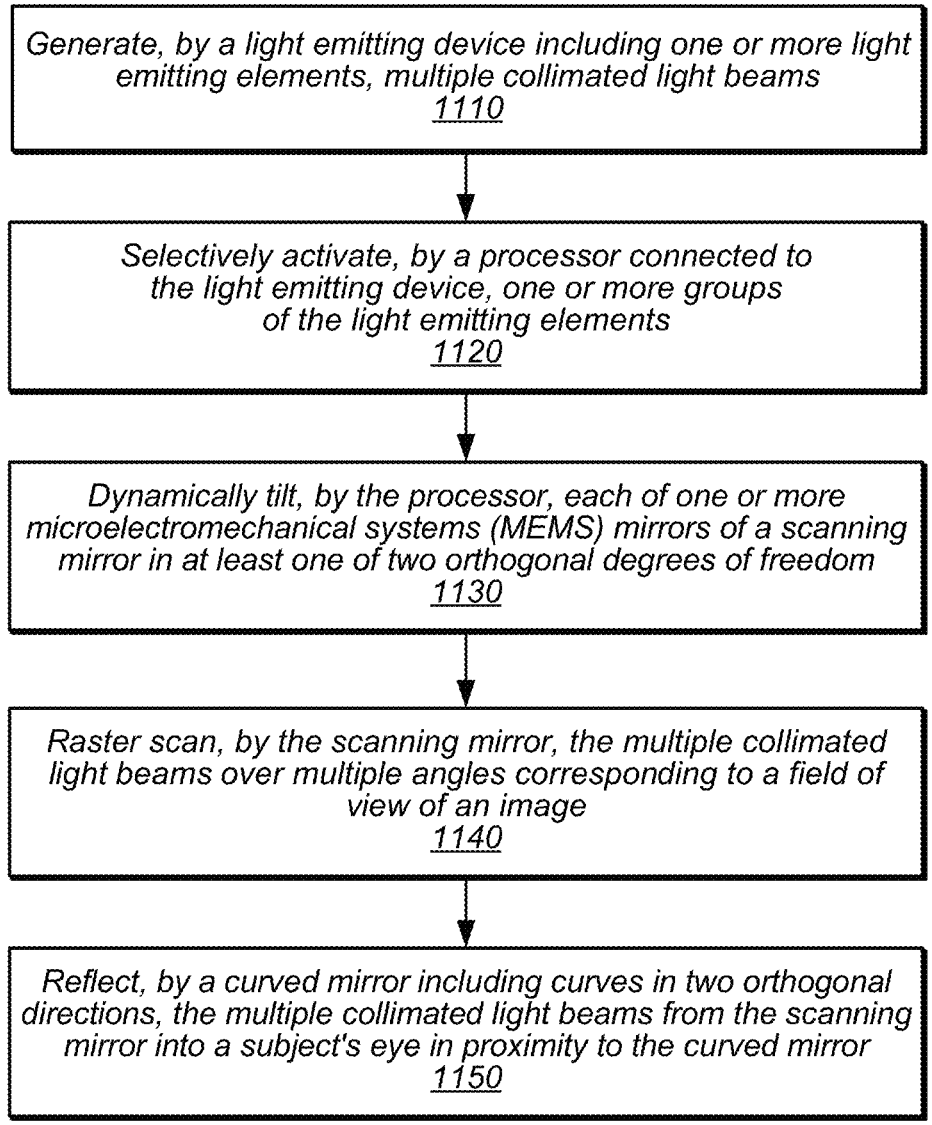
FIG. 17 is a high-level flowchart illustrating a method of operation for a virtual reality device, according to some embodiments.

FIG. 17 is a high-level flowchart illustrating a method of operation for a VR/AR device, according to some embodiments. The method of FIG. 17 may, for example, be implemented by embodiments of a VR/AR device as illustrated in FIGS. 3-16. In some embodiments, a VR/AR device may further include technology, such as one or more image signal processors and/or image processing pipelines, that may apply one or more image processing techniques to virtual reality or augmented reality images.

As indicated at 1110 of FIG. 17, a light emitting device including one or more light emitting elements generates one or more collimated light beams. In some embodiments, the light emitting elements may be vertical cavity surface-emitting lasers (VCSELs) with respective focusing and/or collimation elements (e.g., dynamically adjustable focusing lenses). In some embodiments, the VCSELs may be organized in groups, with each group including a red VCSEL, a blue VCSEL, and a green VCSEL. As indicated at 1120, a processor connected to the light emitting device selectively activates one or more groups of the light emitting elements. As indicated at 1130, the processor dynamically tilts each of one or more MEMS mirrors of a scanning mirror in at least one of two orthogonal degrees of freedom. As indicated at 1140, the scanning mirror raster scans the multiple collimated light beams over multiple angles corresponding to a field of view of an image. As indicated at 1150, a mirror (e.g., an ellipsoid mirror) curved in two orthogonal directions reflects the collimated light beams from the scanning mirror into a subject's eye in proximity to the curved mirror. The collimated light beams reflected by the curved mirror may provide a virtual reality view to the subject.

A virtual reality device as described herein may thus scan high-resolution virtual reality images to a subject's retinas, and may reduce, minimize, or eliminate the effects of accommodation-convergence mismatch. Some embodiments of a virtual reality device as described herein may also provide augmented reality by using partially reflective curved mirrors that reflect virtual images to the subject's eyes, while allowing a portion of external light to pass through the curved mirrors to the subject's eyes.

What is claimed is:
1. An apparatus, comprising:
one or more projectors configured to scan a frame of a scene to a subject's eyes, wherein the projector comprises a focusing mechanism, wherein the frame com- prises a left image scanned to the subject's left eye and a right image scanned to the subject's right eye, wherein objects in the scene are shifted in the two images as a function of triangulation of distance where nearer objects are shifted more than more distant objects; and a controller configured to:
  determine, from depth maps for the two images of the scene generated according to shift data obtained from the two images, a depth at each pixel in the scene; and
  cause the focusing mechanism to focus each pixel at a focus distance that corresponds to the determined depth at the pixel as the frame is being scanned by the one or more projectors;
wherein focusing each pixel at a focus distance that corresponds to the determined depth at the pixel as the frame is being scanned by the one or more projectors causes the objects in the scene that are intended to appear at different depths to be projected to the subject's eyes at correct depths.

2. The apparatus as recited in claim 1, wherein the focusing mechanism comprises a plurality of light emitting elements, wherein the focusing mechanism is configured to focus beams of light emitted by the light emitting elements at different focus distances.

3. The apparatus as recited in claim 2, wherein the one or more projectors further comprise a collimating lens configured to collimate the beams of light emitted by two or more of the light emitting elements to generate a combined beam of light for a given pixel.

4. The apparatus as recited in claim 3, wherein the plurality of light emitting elements is tilted with respect to an optical axis of the apparatus such that different ones of the light emitting elements emit light beams at different distances from the collimating lens, wherein the different distances from the collimating lens cause the beams of light emitted by the different ones of the light emitting elements to be focused at the different focus distances.

5. The apparatus as recited in claim 2, wherein the one or more projectors further comprise a scanning mirror configured to scan the focused beams of light emitted by the light emitting elements to generate a light field of the scene at the subject's eyes.

6. The apparatus as recited in claim 2, wherein the focusing mechanism further comprises a plurality of microlenses located in front of the light emitting elements, wherein each microlens corresponds to one of the light emitting elements, and wherein the microlens that corresponds to a given light emitting element is configured to focus the beam of light emitted by the respective light emitting element at a respective focus distance.

7. The apparatus as recited in claim 2, wherein the plurality of light emitting elements include red light emitting elements, blue light emitting elements, and green light emitting elements.

8. The apparatus as recited in claim 2, wherein the plurality of light emitting elements include vertical cavity surface emitting lasers (VCSELs).

9. The apparatus as recited in claim 2, wherein the plurality of light emitting elements include edge emitting lasers.

10. A system, comprising:
  two projectors configured to scan a frame of a scene pixel by pixel to a subject's eyes to provide a three-dimensional (3D) view of the scene, wherein the frame comprises a left image scanned by a left projector to the subject's left eye and a right image scanned by a right projector to the subject's right eye, wherein objects in the scene are shifted in the two images as a function of triangulation of distance where nearer objects are shifted more than more distant objects;
  a focusing mechanism; and
  a controller configured to:
    determine, from depth maps for the two images of the scene generated according to shift data obtained from the two images, a depth at each pixel in the scene; and
    cause the focusing mechanism to focus each pixel at a focus distance that corresponds to the determined depth at the pixel as the frames is being scanned by the projector;
  wherein focusing each pixel at a focus distance that corresponds to the determined depth at the pixel as the frames is being scanned by the projectors causes the objects in the scene that are intended to appear at different depths to be projected to the subject's eyes at correct depths.

11. The system as recited in claim 10, wherein each projector comprises:
  a plurality of light emitting elements configured to emit beams of light for each pixel under control of the controller;
  a collimating lens configured to collimate the beams of light emitted by two or more of the light emitting elements to generate a combined beam of light for each pixel; and
  a scanning mirror configured to scan the combined beams of light for the pixels to generate a scanned light field of the image at the subject's respective eye.

12. The system as recited in claim 11, wherein the controller is configured to, for each pixel scanned by a respective one of the projectors:
  tilt the respective scanning mirror in one or more orthogonal degrees of freedom to scan the combined beams of light for the pixel in the image;
  determine the depth at the pixel; and
  selectively activate two or more of the light emitting elements that are configured to focus emitted beams of light at the focus distance that corresponds to the determined depth at the pixel in the image.

13. The system as recited in claim 11, wherein the plurality of light emitting elements is tilted with respect to an optical axis of the apparatus such that different ones of the light emitting elements emit light beams at different distances from the collimating lens, wherein the different distances from the collimating lens cause the beams of light emitted by the different ones of the light emitting elements to be focused at the different focus distances.

14. The apparatus as recited in claim 11, further comprising a plurality of microlenses located in front of the light emitting elements, wherein each microlens corresponds to one of the light emitting elements, and wherein the microlens that corresponds to a given light emitting element is configured to focus the beam of light emitted by the respective light emitting element at a respective focus distance.

15. A method, comprising:
  scanning, by one or more projectors under control of a controller, a frame of a scene to a subject's eyes, wherein said scanning comprises:
    scanning a left image and a right image of the frame by the one or more projectors to the subject's left and right eyes respectively, wherein objects in the scene are shifted in the two images as a function of triangulation of distance where nearer objects are shifted more than more distant objects;

determining, by the controller, from depth maps for the two images of the scene generated according to shift data obtained from the two images, a depth at each pixel in the scene; and focusing, by the one or more projectors under control of the controller, each pixel at a focus distance that corresponds to the determined depth at the pixel as the frame is being scanned by the projector;

wherein focusing each pixel at a focus distance that corresponds to the determined depth at the pixel as the frame is being scanned by the one or more projectors causes the objects in the scene that are intended to appear at different depths to be projected to the subject's eyes at correct depths.

16. The method as recited in claim 15, wherein the one or more projectors comprise a plurality of light emitting elements, wherein said focusing comprises focusing beams of light emitted by the light emitting elements at different focus distances.

17. The method as recited in claim 16, further comprising:

collimating, by a collimating lens of the one or more projectors, the beams of light emitted by two or more of the plurality of light emitting elements to generate a combined beam of light for each pixel; and scanning, by a scanning mirror of the one or more projectors, the combined beams of light for the pixels to generate a scanned light field of the image at the subject's respective eye.

18. The method as recited in claim 17, wherein the plurality of light emitting elements is tilted with respect to an optical axis such that different ones of the light emitting elements emit light beams at different distances from the collimating lens, wherein the different distances from the collimating lens cause the beams of light emitted by the different ones of the light emitting elements to be focused at the different focus distances.

19. The apparatus as recited in claim 16, wherein the one or more projectors further comprise a plurality of microlenses located in front of the light emitting elements, wherein each microlens corresponds to one of the light emitting elements, and wherein the microlens that correspond to a given light emitting element focuses the beam of light emitted by the respective light emitting element at a respective focus distance.

* * * * *